(12) United States Patent
Noorzad et al.

(10) Patent No.: US 10,225,036 B2
(45) Date of Patent: Mar. 5, 2019

(54) COMMUNICATION SYSTEMS AND METHODS OF COMMUNICATING UTILIZING COOPERATION FACILITATORS

(71) Applicants: California Institute of Technology, Pasadena, CA (US); The Research Foundation for the State University of New York, Amherst, NY (US)

(72) Inventors: Parham Noorzad, San Diego, CA (US); Michelle Effros, San Marino, CA (US); Michael Langberg, Clarence, NY (US)

(73) Assignees: California Institute of Technology, Pasadena, CA (US); The Research Foundation for the State University of New York, Amherst, NY (US)

( * ) Notice: Subject to any disclaimer, the term of this patent is extended or adjusted under 35 U.S.C. 154(b) by 58 days.

(21) Appl. No.: 15/181,393

(22) Filed: Jun. 13, 2016

(65) Prior Publication Data

US 2016/0365940 A1 Dec. 15, 2016

Related U.S. Application Data

(60) Provisional application No. 62/174,026, filed on Jun. 11, 2015, provisional application No. 62/281,636, filed on Jan. 21, 2016.

(51) Int. Cl.
*H04J 13/16* (2011.01)
*H04W 4/06* (2009.01)
*H04B 7/26* (2006.01)

(52) U.S. Cl.
CPC ............ *H04J 13/16* (2013.01); *H04B 7/2637* (2013.01); *H04W 4/06* (2013.01)

(58) Field of Classification Search
CPC ......... H04J 13/16; H04W 4/06; H04B 7/2637
(Continued)

(56) References Cited

U.S. PATENT DOCUMENTS

2008/0002581 A1* 1/2008 Gorsetman ........... H04L 1/0003
370/232
2009/0016415 A1* 1/2009 Chakrabarti ............ H03M 7/30
375/214

(Continued)

OTHER PUBLICATIONS

Ahlswede, "Multi-way Communication Channels", Proc. International Symposium on Information Theory, 1971, 28 pgs.

(Continued)

*Primary Examiner* — Chuong T Ho
(74) *Attorney, Agent, or Firm* — KPPB LLP

(57) ABSTRACT

Systems and methods for improved data transmission utilizing a communication facilitator are described in accordance with embodiments of the invention. One embodiment includes a plurality of nodes, that each comprise: a transmitter; a receiver; and an encoder that encodes message data for transmission using a plurality of codewords; a cooperation facilitator node comprising: a transmitter; and a receiver; wherein the nodes are configured to transmit data parameters to the cooperation facilitator; wherein the cooperation facilitator is configured to generate cooperation parameters based upon the data parameters received from the nodes; wherein the cooperation facilitator is configured to transmit cooperation parameters to the nodes; and wherein the encoder in each of the nodes selects a codeword from the plurality of codewords based at least in part upon the cooperation parameters received from the communication facilitator and transmit the selected codeword via the multiple access channel.

30 Claims, 13 Drawing Sheets

(58) Field of Classification Search
USPC .................................. 370/208, 260, 229, 230
See application file for complete search history.

(56) References Cited

U.S. PATENT DOCUMENTS

| | | | | |
|---|---|---|---|---|
| 2009/0310586 | A1* | 12/2009 | Shatti ..................... | H04B 7/026 |
| | | | | 370/338 |
| 2012/0307746 | A1* | 12/2012 | Hammerschmidt ....................... | |
| | | | | H04W 72/1242 |
| | | | | 370/329 |
| 2012/0307747 | A1* | 12/2012 | MacInnis .......... | H04W 72/1242 |
| | | | | 370/329 |
| 2014/0140188 | A1* | 5/2014 | Shattil ................ | H04L 27/2601 |
| | | | | 370/208 |

OTHER PUBLICATIONS

Ahlswede, "The Capacity Region of a Channel with Two Senders and Two Receivers", The Annals of Probability, 1974, vol. 2, No. 5, pp. 805-814.
Ahlswede et al., "Network Information Flow", IEEE Transactions on Information Theory, Jul. 2000, vol. 46, No. 4, pp. 1204-1216.
Angus, "The probability integral transform and related results", SIAM Review, Dec. 1994, vol. 36, No. 4, pp. 652-654.
Boyd et al., "Convex Optimization", Cambridge University Press, 2004, 703 pages. (presented in five parts).
Cai, "The Maximum Error Probability Criterion, Random Encoder, and Feedback, in Multiple Input Channels", Entropy, Jan. 2014, vol. 16, pp. 1211-1242.
Cemel et al, "The multiple-access channel with partial state information at the encoders", IEEE Transactions on Information Theory, Nov. 2005, vol. 51, No. 11, pp. 3992-4003.
Chan et al., "On capacity regions of non-multicast networks", IEEE International Symposium on Information Theory Proceedings, Jul. 2010, pp. 2378-2382.
Chien et al., "A practical (t, n) multi-secret sharing scheme", IEICE Transactions on Fundamentals of Electronics, Communications and Computer Sciences, vol. E83-A, No. 12, Dec. 25, 2000, pp. 2762-2765.
Costa, "Writing on Dirty Paper", IEEE Transaction on Information Theory, May 1983, vol. IT-29, No. 3, pp. 439-441.
Cover, "Some Advances in Broadcast Channels", Stanford University—Department of Statistics, Sep. 1974, Technical Report 9, 39 pgs.
Cover et al., "Multiple Access Channels with Arbitrarily Correlated Sources", IEEE Transactions on Information Theory, Nov. 1980, vol. IT-26, No. 6, pp. 648-657.
Dabora et al., "Broadcast Channels with Cooperating Decoders", IEEE Transactions on Information Theory, Dec. 2006, pp. 1-17, arXiv:cs/0505032.
Dueck, "Maximal error capacity regions are smaller than average error capacity regions for multi-user channels", Problems of Control and Information Theory, 1978, vol. 7, No. 1, pp. 11-19.
Dueck, "The Strong Converse of the Coding Theorem for the Multiple-access Channel", Journal of Combinatorics, Information, and System Sciences, 1981, vol. 6, pp. 187-196.
El Gamal et al., "A proof of Marton's coding theorem for the discrete memoryless broadcast channel", IEEE Transactions on Information Theory, Jan. 1981, vol. IT-27, No. 1, pp. 120-122.
Goldsmith et al., "Capacity of Fading Channels with Channel Side Information", IEEE Transactions on Information Theory, Nov. 1997, vol. 43, No. 6, pp. 1986-1992.
Gu, "On Achievable Rate Regions for Source Coding Over Networks", Thesis, 2009, 154 pgs.
Gu et al., "A Continuity Theory for Lossless Source Coding over Networks", Forty-Sixth Annual Allerton Conference Communication, Control and Computing, 2008, pp. 1527-1534.
Gu et al., "A Strong Converse for a Collection of Netowk Source Coding Problems", In the Proceedings of the IEEE International Symposium on Information Theory, Seoul, Korea, Jun. 28-Jul. 3, 2009, pp. 2316-2320.

Han, "The capacity region of general multiple-access channel with certain correlated sources", Information and Control, Jan. 1979, vol. 40, pp. 37-60.
Heegard et al., "On the Capacity of Computer Memory with Defects", IEEE Transactions on Information Theory, Sep. 1983, vol. IT-29, No. 5, pp. 731-739.
Hekstra et al., "Dependence balance bounds for sing-output two-way channels", IEEE Transactions on Information Theory, Jan. 1989, vol. 35, No. 1, pp. 44-53.
Ho et al., "On Equivalence Between Network Topologies", Allerton Annual Conference on Communications, Control, and Computing, Monticello, IL, Sep. 2010, 8 pgs., arXiv:1010.0654, Oct. 4, 2010.
Hoeffding, "Probability inequalities for sums of bounded random variables", American Statistical Association Journal, Mar. 1963, vol. 58, No. 301, pp. 13-30.
Hunter, "Matplotlib: A 2D graphics environment", IEEE Computing in Science and Engineering, Jun. 18, 2007, vol. 9, Issue 3, pp. 90-95.
Jafar, "Capacity with Causal and Noncausal Side Information—A Unified View", IEEE Trans. Inf. Theory, Jan. 2006, vol. 52, No. 12, pp. 5468-5474.
Jalali et al., "On the impact of a single edge on the network coding capacity", Information Theory and Applications Workshop, San Diego, CA, 2011, 5 pgs., arXiv:1607.06793.
Koetter et al., "A Theory of Network Equivalence—Part II: Multiterminal Channels", IEEE Transactions on Information Theory, Jul. 2014, vol. 60, No. 7, pp. 3709-3732.
Kosut et al., "Strong Converses are Just Edge Removal Properties", arXiv:1706.08172, Jun. 2017, 53 pgs.
Kramer et al., "Cooperative Communications", Foundations and Trends in Networking, Aug. 2006, vol. 1, No. 3-4, pp. 271-425.
Langberg et al., "Network coding: Is zero error always possible?", arXiv:1102.3162v2 [cs.IT], in Proc. Allerton Conf. Communication, Control and Computing, 2011, 8 pgs.
Langberg et al., "On the capacity advantage of a single bit", IEEE Globecom Workshops, Jul. 2016, 6 pgs.
Langberg et al., "Source coding for dependent sources", IEEE Information Theory Workshop, Sep. 2012, pp. 70-74.
Lapidoth et al., "The Multiple-Access Channel with Causal Side Information: Common State", IEEE Transactions on Information Theory, Jan. 2013, vol. 59, No. 1, pp. 32-50.
Lapidoth et al., "The Multiple-Access Channel with Causal Side Information: Double State", IEEE Transactions on Information Theory, Mar. 2013, vol. 59, No. 3, pp. 1379-1393.
Lee et al., "Outer bounds and a functional study of the edge removal problem", in IEEE Information Theory Workshop, Sep. 2013, 5 pgs.
Maric et al., "Capacity of Interference Channels with Partial Transmitter Cooperation", IEEE Transactions on Information Theory, Oct. 2007, vol. 53, No. 10, pp. 3536-3548.
Marton, "A Coding Theorem for the Discrete Memoryless Broadcast Channel", IEEE Transactions on Information Theory, May 1979, vol. IT-25, No. 3, pp. 306-311.
Noorzad, "Network Effect in Small Networks: A Study of Cooperation", Thesis, Jun. 2017, 169 pgs.
Noorzad et al, "On the power of cooperation: can a little help a lot? (extended version,", online, Jan. 2014, arXiv:1401.6498, 10 pgs.
Noorzad et al., "Can Negligible Cooperation Increase Capacity? The Average-Error Case", arXiv: 1801.03655v1, Jan. 11, 2018, 20 pgs.
Noorzad et al., "Can Negligible Cooperation Increase Network Reliability?", arXiv: 1601.05769v2, Sep. 30, 2016, 27 pgs.
Noorzad et al., "On the Cost and Benefit of Cooperation (extended version)", Proc. IEEE Int. Symp., Information Theory, 2015, 15 pgs., arXiv:1504.04432.
Noorzad et al., "On the Power of Cooperation: Can a Little Help a Lot? (Extended Version)", arXiv:1401.6498v2, Apr. 27, 2014, 10 pgs.
Noorzad et al., "The Benefit of Encoder Cooperation in the Presence of State Information", arXiv: 1707.05869v1, Jul. 18, 2017, 20 pgs.
Noorzad et al., "The Unbounded Benefit of Encoder Cooperation for the k-user MAC", arXiv: 1601.06113v2, Sep. 30, 2016, 46 pgs.
Permuter et al., "Message and state cooperation in multiple access channels", IEEE Trans. Inf. Theory, Nov. 2011, vol. 57, No. 10, pp. 6379-6396, arXiv:1006.2022.

(56) References Cited

OTHER PUBLICATIONS

Sarwate et al., "Some observations on limited feedback for multi-access channels", IEEE International Symposium on Information Theory, Aug. 2009, pp. 394-397.

Schneider, "Convex Bodies: The Brunn-Minkowski Theory", Cambridge University Press, 1993, 22 pgs.

Shannon et al., "A Mathematical Theory of Communication", The Bell System Technical Journal, vol. 27, Jul. Oct. 1948, 379-423, 623-656.

Simeone et al., "Three-User Gaussian Multiple Access Channel with Partially Cooperating Encoders," in Circuits, Systems, Computers, 1977, 5 pgs.

Slepian et al., "A coding theorem for multiple access channels with correlated sources", Bell System Technical Journal, Sep. 1973, vol. 52, No. 7, pp. 1037-1076.

Somekh-Baruch et al., "Cooperative Multiple Access Encoding with States Available at One Transmitter", IEEE Transaction on Information Theory, Sep. 16, 2008, vol. 54, No. 10, pp. 4448-4469.

Spencer, "The Lectures on the Probabilistic Method", Society for Industrial and Applied Mathematics, 1994, 97 pgs.

Tse et al., "Multiaccess Fading Channels—Part I: Polymatroid Structure, Optimal Resource Allocation and Throughput Capacities", IEEE Transactions on Information Theory, Nov. 1998, vol. 44, No. 7, pp. 2796-2815.

Ulrey, "The Capacity Region of a Channel with s Senders and r Receivers", Information and Control, Nov. 1975, vol. 29, pp. 185-203.

Watanabe, "Information theoretical analysis of multivariate correlation", IBM J. Res. Dev., 1960, vol. 4, pp. 66-82.

Wigger, "Cooperation on the Multiple-Access Channel", thesis, Sep. 18, 2008, 242 pgs.

Willems, "The discrete memoryless multiple access channel with partially cooperating encoders", IEEE Transactions on Information Theory, 1983 vol. IT-29, No. 3, pp. 441-445.

Willems, "The maximal-error and average-error capacity region of the broadcast channel are identical: A direct proof", Problems of Control and Information Theory, 1990, vol. 19, No. 4, pp. 339-347.

Wyner, "Recent results in the Shannon Theory", IEEE Transaction on Information Theory, Jan. 1974, vol. IT-20, No. 1, pp. 2-10.

Bass, "Real Analysis for Graduate Students", 2013, 2d edition, 418 pgs.

Bertsimas et al., "Introduction to Linear Optimization", Athena Scientific, 1997, 588 pgs.

Billingsley, "Probability and Measure", Wiley Series in Probability and Mathematical Statistics, 3d edition, SIAM, 1995, 608 pgs.

Cormen et al., "Introduction to algorithms", 2d edition, MIT Press, 2001, 985 pgs.

Cover et al., "Elements of Information Theory", Wiley, Oct. 17, 2006, 397 pgs.

Dembo et al., "Large Deviations Techniques and Applications", Springer-Verlag, 2d Edition, 1998.

El Gamal et al., "Network Information Theory", 2012, Cambridge University Press, 2d edition.

Luchetti, "Convexity and Well-Posed Problems", 1st edition, Springer, 2006.

\* cited by examiner

COMMUNICATION SYSTEMS AND METHODS OF COMMUNICATING UTILIZING COOPERATION FACILITATORS

CROSS-REFERENCE TO RELATED APPLICATIONS

The present invention claims priority to U.S. Provisional Patent Application Ser. No. 62/174,026 entitled "Cooperation Facilitator" to Noorzad et al., filed Jun. 11, 2015, and U.S. Provisional Patent Application Ser. No. 62/281,636 entitled "Cooperation Facilitator" to Noorzad et al., filed Jan. 21, 2016. The disclosure of U.S. Provisional Patent Application Ser. No. 62/174,026 and U.S. Provisional Patent Application Ser. No. 62/281,636 are herein incorporated by reference in their entirety.

STATEMENT OF FEDERAL SUPPORT

This invention was made with government support under Grant No. CCF1321129, and under Grant No. CCF1527524, and under Grant No. CCF1526771awarded by the National Science Foundation. The government has certain rights in the invention.

FIELD OF THE INVENTION

The present invention generally relates to data transmission and more specifically relates to a cooperative coding scheme to achieve improved data transmission.

BACKGROUND

Data transmission is the process of sending information in a computing environment. The speed at which data can be transmitted is its rate. Data rates are generally measured in megabits or megabytes per second. As consumer use of larger amounts of data increases (for example an increase in the quality of on demand video streaming and/or downloading larger and larger data files), a demand for increased data rates similarly increases.

Data transmission can be wired or wireless. Wired communication protocols transmit data over a physical wire or cable and can include (but are not limited to) telephone networks, cable television networks (which can transmit cable television and/or Internet services), and/or fiberoptic communication networks. Wireless communication protocols on the other hand transmit data without a physical wire and can include (but are not limited to) radio, satellite television, cellular telephone technologies (such as Long-Term Evolution (LTE)). Wi-Fi, and Bluetooth. Many networks incorporate both wireline and wireless communication. For example, the internet can be accessed by either wireline or wireless connections.

SUMMARY OF THE INVENTION

An important challenge in communication systems engineering is the growing demand for network resources. One way to increase network performance in accordance with various embodiments of the invention is to enable cooperation in the network, that is, to allow some network nodes to help others achieve improved performance, such as higher transmission rates or improved reliability. Any network node that enables other nodes to cooperate can be referred to as a cooperation facilitator (CF). One metric that can be used to evaluate the benefits of using a CF is a metric referred to herein as sum-capacity. The sum-capacity of a network is the maximum amount of information that is possible to transmit over that network. Cooperation gain can be defined as the difference between the sum-capacity of a network with cooperation and the sum-capacity of the same network without cooperation. In many instances, the cooperation gain of coding strategies in accordance with various embodiments of the invention grows faster than any linear function, when viewed as a function of the total number of bits the CF shares with the transmitters. This means that a small increase in the number of bits shared with the transmitters results in a large cooperation gain. It is important to note, that the benefits obtained using a CF are not limited to wireline/wireless communications, but may also include a variety of other areas where information theory is frequently used, such as data storage. It is likewise important to note that increasing sum-capacity is not the only potential benefit of cooperation: a variety of other benefits are possible including improved reliability and increased individual rates.

Systems and methods for improved data transmission utilizing a communication facilitator are described in accordance with embodiments of the invention. One embodiment includes a plurality of nodes, that each comprise: a transmitter; a receiver; and an encoder that encodes message data for transmission using a plurality of codewords; a cooperation facilitator node comprising: a transmitter, and a receiver; wherein the plurality of nodes are configured to transmit data parameters to the cooperation facilitator; wherein the cooperation facilitator is configured to generate cooperation parameters based upon the data parameters received from the plurality of nodes; wherein the cooperation facilitator is configured to transmit cooperation parameters to the plurality of nodes; and wherein the encoder in each of the plurality of nodes selects a codeword from the plurality of codewords based at least in part upon the cooperation parameters received from the communication facilitator and transmit the selected codeword via the multiple access channel.

In a further embodiment, a sum-capacity of the communication system achieved using codewords selected at least in part based upon the cooperation parameters received from the cooperation facilitator is greater than the sum-capacity of the communication system achieved when each of the plurality of encoders encodes data without communicating with a cooperation facilitator.

In another embodiment, a reliability of the communication system achieved using codewords selected at least in part based upon the cooperation parameters received from the cooperation facilitator is greater than the reliability of the communication system achieved with each of the plurality of encoders encodes data without communicating with a cooperation facilitator.

In a still further embodiment, the cooperation parameters include conferencing parameters.

In still another embodiment, the cooperation parameters include coordinating parameters.

In a yet further embodiment, the transmitter in each of the plurality of nodes transmits data via a multiple access channel.

In yet another embodiment, the multiple access channel is a shared wireless channel.

In a further embodiment again, the multiple access channel is a Gaussian multiple access channel.

In another embodiment again, the plurality of nodes is two nodes.

In a further additional embodiment, the plurality of nodes is at least three nodes.

In another additional embodiment, the transmitter in each of the plurality of nodes transmits to a plurality of receivers.

In a still yet further embodiment, the cooperation facilitator generates multiple rounds of cooperation parameters prior to codeword transmission.

In still yet another embodiment, cooperation parameters are transmitted to the plurality of nodes by the coordination facilitator via a separate channel to a channel on which one or more of the plurality of nodes transmit codewords selected at least in part based upon the cooperation parameters received from the cooperation facilitator.

In a still further embodiment again, a cooperation facilitator, comprising: a transmitter; a receiver; and a cooperation facilitator controller; wherein the cooperation facilitator controller is configured to receive data parameters from a plurality of nodes; wherein the cooperation facilitator is configured to generate cooperation parameters based upon the data parameters received from the plurality of nodes; and wherein the cooperation facilitator is configured to transmit cooperation parameters to the plurality of nodes that enable encoders in each of the plurality of nodes to select a codeword from a plurality of codewords for transmission.

In still another embodiment again, a sum-capacity of a portion of a communication network including the cooperation facilitator achieved by encoders in each of the plurality of nodes using codewords selected at least in part based upon the cooperation parameters received from the cooperation facilitator is greater than the sum-capacity of the portion of a communication network achieved when each of the plurality of encoders encodes data without communicating with a cooperation facilitator.

Another further embodiment of the method of the invention includes: a reliability of a portion of a communication network including the cooperation facilitator achieved by encoders in each of the plurality of nodes using codewords selected at least in part based upon the cooperation parameters received from the cooperation facilitator is greater than the reliability of the portion of a communication network achieved with each of the plurality of encoders encodes data without communicating with a cooperation facilitator.

Still another further embodiment of the method of the invention includes: the cooperation parameters include conferencing parameters.

In a further embodiment again, the cooperation parameters include coordinating parameters.

In another embodiment again, a transmitter in each of the plurality of nodes transmits data via a multiple access channel.

In a further additional embodiment, the multiple access channel is a shared wireless channel.

In another additional embodiment, the multiple access channel is a Gaussian multiple access channel.

In a still yet further embodiment, the plurality of nodes is two nodes.

In still yet another embodiment, the plurality of nodes is at least three nodes.

In a still further embodiment again, the cooperation facilitator generates multiple rounds of cooperation parameters prior to codeword transmission.

DETAILED DESCRIPTION

Figure 1:
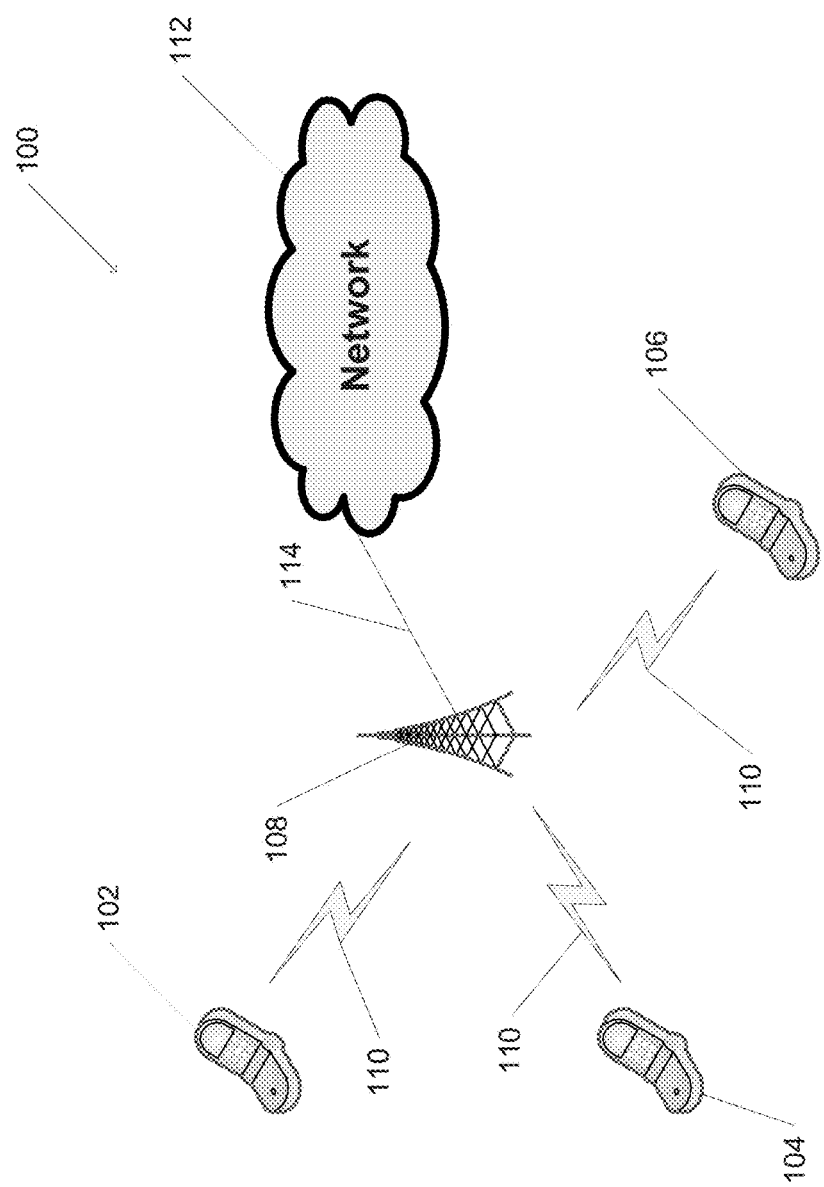
FIG. 1 is a diagram illustrating a system incorporating a cooperation facilitator for at least two other transmitters sharing a multiple access channel in accordance with an embodiment of the invention.

As an example, we now turn to the drawings, systems and methods of improving data transmission over a multiple access channel (MAC) by utilizing communication between encoders through a cooperation facilitator (CF) in accordance with various embodiments of the invention are illustrated. Data networks such as (but not limited to) a cellular network that rely upon MACs have limits on the amount of data that can be sent or received by the multiple transmitters accessing the channel. In many embodiments, communication between the transmitters via a cooperation facilitator device that coordinates or otherwise interacts with the encoding of transmitted data by encoders within the transmitters can achieve significant improvements in the performance of the network. In certain embodiments, coordination by a cooperation facilitator can increase the rate of a MAC. In several embodiments, transmission reliability can also be increased (in addition to transmission rate). While communication between a cooperation facilitator and multiple transmitters or other devices within a network can utilize system resources, in many embodiments an overall improvement in the performance of the network that incorporates the MAC can be achieved. The benefits of using a CF to coordinate encoding by the transmitters are primarily achieved, because each cooperating transmitter only needs to transmit a message including information about itself. The CF can transmit a message that is based upon the messages received from the cooperating transmitters to facilitate cooperation between the transmitters to coordinate the encoders in the transmitters. The transmitters send an encoding of their message to the CF, which calculates a combined encoding to produce messages that coordinate the cooperation to the transmitters. As is discussed in detail below, when the cooperation is coordinated effectively the benefits of the cooperation can result in an increase in evaluation metrics. For example, for capacity, the benefits of cooperation for the transmitters exceeds the cost of sending data to facilitate cooperation.

While much of the discussion that follows relates to systems in which two encoders communicate with a cooperation facilitator, in many other embodiments more than two encoders communicate with a cooperation facilitator. In addition, communication can be between multiple transmitters and a single receiver or between multiple transmitters and multiple receivers or between transmitters and/or receivers and devices that are both transmitters and receivers in accordance with various embodiments of the invention. In several embodiments, encoders pass portions of the messages they are encoding to the CF. The CF can pass portions of these messages unaltered to other encoders in the system. Additionally, the CF can "coordinate" transmissions, i.e. enable the encoders to create dependence among independently generated codewords. In several embodiments, encoders can utilize information from the CF as well as portions of the input message which did not go through the CF to generate the encoded message. Communication systems and methods of communicating utilizing cooperation facilitators in accordance with various embodiments of the invention are discussed further below.

Cooperation Facilitator Systems

An example communication system incorporating a device that acts as a cooperation facilitator for at least two other transmitters sharing a MAC in accordance with an embodiment of the invention is illustrated in FIG. 1. Cellular devices 102, 104, and 106 connect to cellular tower 108 via a wireless connection 110. These cellular devices can include (but are not limited to) cellular phones, tablets modems, and/or base stations. Cellular tower 108 connects to network 112 via wired connection 114. Network 112 can be (but is not limited to) a larger cellular telephone network and/or the Internet with potential wired and/or wireless connections to devices 102, 104 and/or 106. As can readily be appreciated, a larger cellular telephone network would include many more cellular towers and involve a very large number of MACs and other communication components shared by the cellular subscriber devices that utilize the network.

At any given time, there is a maximum amount of data that can be transmitted to and from a specific cellular tower 108 by cellular devices 104 and/or 106. This can be referred to as the throughput of the network. For example, when a large number of cellular devices try to receive data from the cellular tower at the same time, download speeds will be slower compared to a single device trying to receive data from the cellular tower. In various embodiments of the invention, cellular device 102 acts as a cooperation facilitator (CF) to coordinate data transmission by cellular devices 104, 106 and 108. In many embodiments of the invention, utilizing some of the available bandwidth to coordinate the transfer of other data can greatly increase the throughput and/or reliability of the transfer of that other data. Cooperation among network nodes is further described below and conceptually illustrated below in FIG. 2.

In many embodiments of the invention, the CF device can communicate with other cellular devices to coordinate data transfer over (but not limited to) the cellular network. Bluetooth, and/or WIFI. In several other embodiments, a CF can be software running on one or more cellular devices. It should readily be apparent that the use of a cellular network is merely illustrative, and a cooperation facilitator can be utilized in a variety of applications to improve data transmissions. Although a variety of cooperation facilitator systems are described above with reference to FIG. 1, any of a variety of networks for improving data transmission can be utilized as appropriate to the requirements of specific applications in accordance with various embodiments of the invention. Cooperation among network nodes is discussed below.

Figure 2:
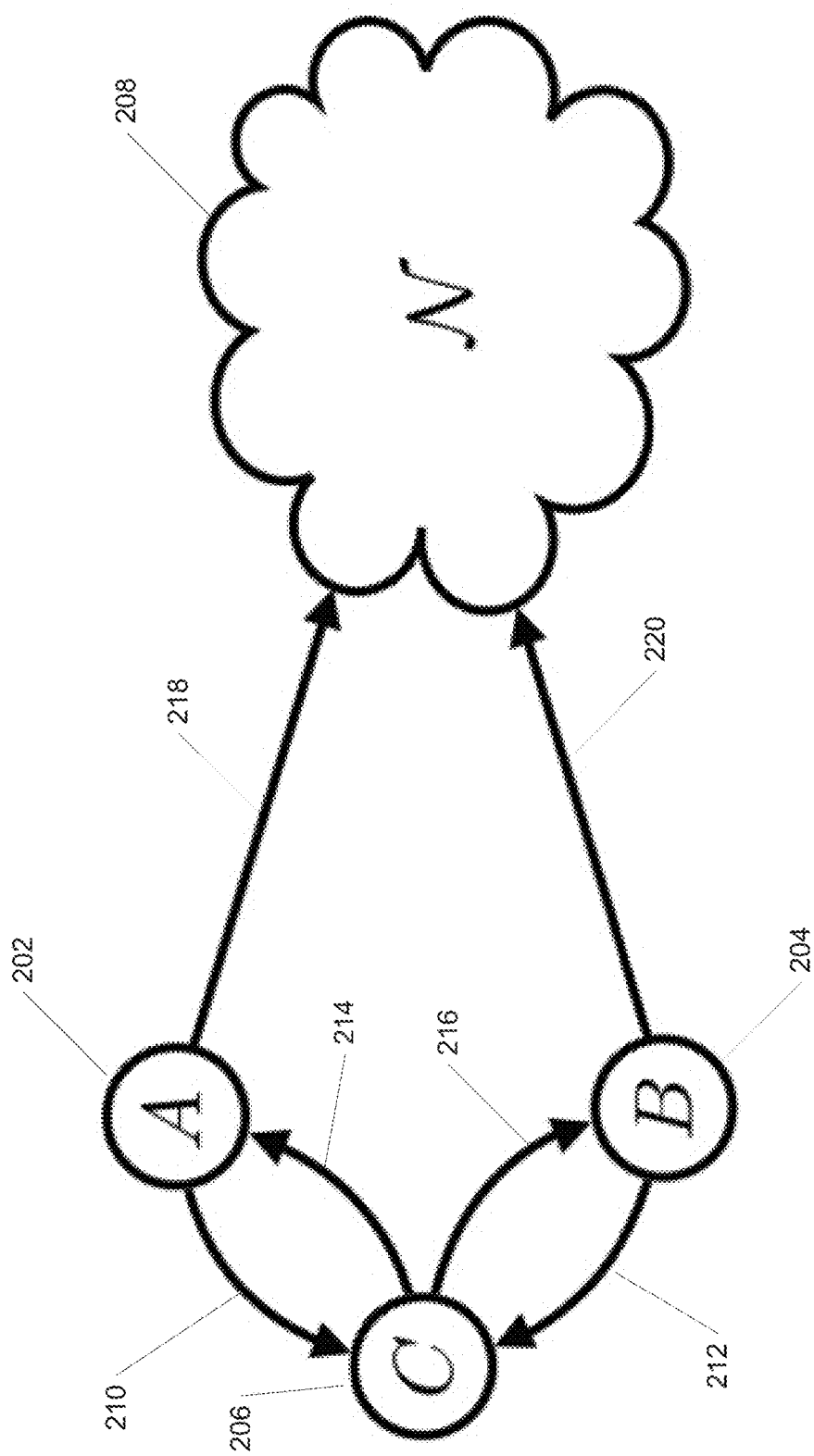
FIG. 2 is a diagram conceptually illustrating cooperation among network nodes in accordance with an embodiment of the invention.

FIG. 2 conceptually illustrates cooperation among network nodes. Cooperation facilitator node C 206 facilitates communication between node A 202, node B 204 and network 208. Node A 202 passes information to node C 206 via connection 210. This connection (and all connections in this conceptual illustration) can be wired and/or wireless. Similarly, node B 204 passes information to node C 206 via connection 212. CF node C 206 coordinates data transmission and passes information to node A 202 via connection 214 and node B 204 via connection 216. Specifics of data transmission to and from the CF will be described in greater detail below and can include (but is not limited to) portions of data being passes from node A to node B via node C without further calculations as well as the results of calculations performed on data by the CF. In a coordinated manner, node A 202 passes information to network 208 via connection 218, and node B 204 passes information to network 208 via connection 220.

Figure 3:
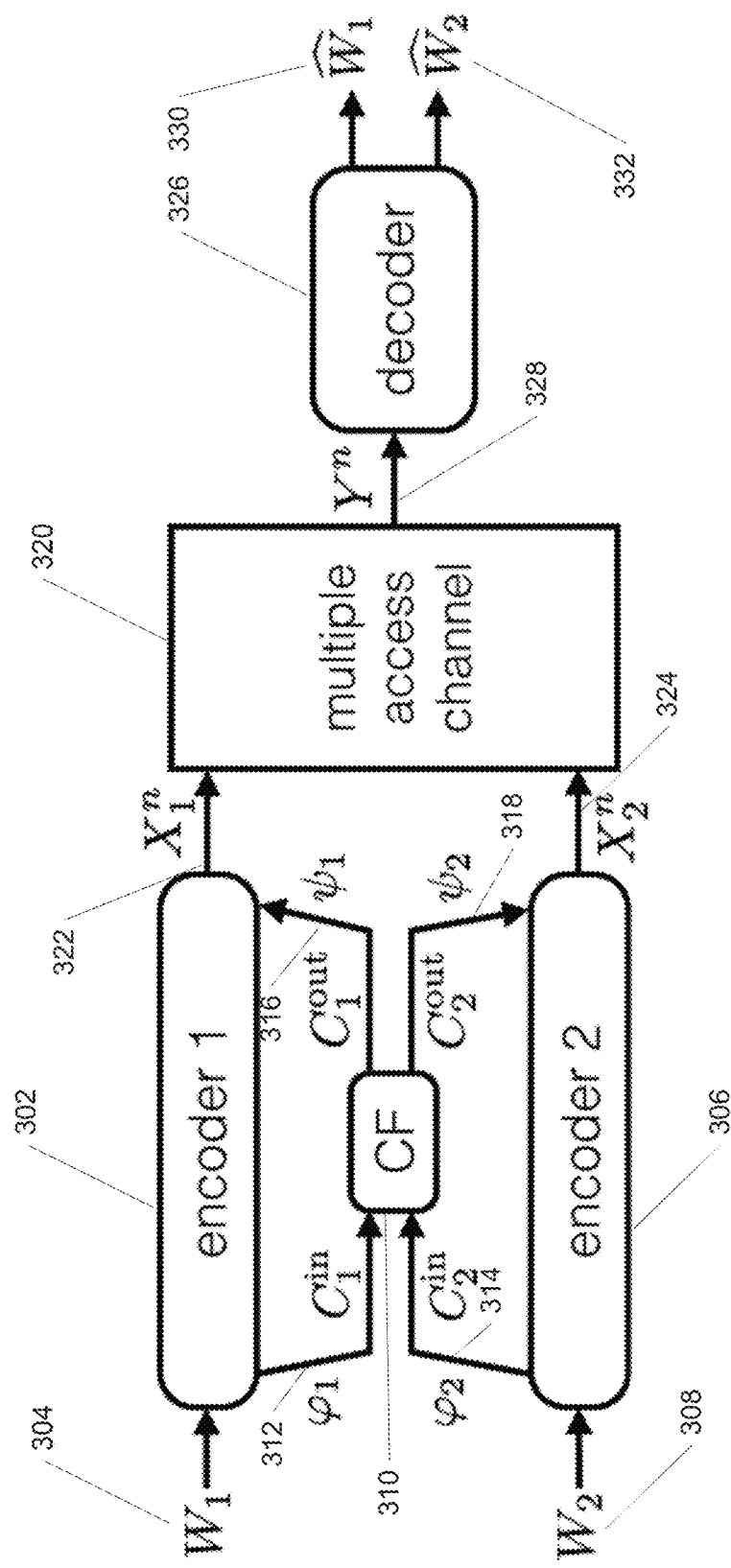
FIG. 3 is a diagram illustrating a cooperation facilitator system utilizing a multiple access channel in accordance with an embodiment of the invention.

FIG. 3 illustrates a cooperation facilitator system utilizing a multiple access channel (MAC) in accordance with several embodiments of the invention. Encoder one 302 receives message one 304. Similarly, encoder two 306 receives message two 308. Cooperation Facilitator (CF) 310 receives data from encoder one 302 via connection 312 and from encoder two 304 via connection 314. Connections 312 and 314 (as well as all other connections in FIG. 3) can be either wired and/or wireless. CF 310 passes information to encoder one 302 via connection 316 and to encoder two via connection 318. Information passed to and from CF 310 will be discussed in greater detail below and can include (but is not limited to) portions of information being passed from encoder one to encoder two via the CF without further calculations as well as the results of calculations performed on data by the CF.

In several embodiments of the invention, encoders can transmit information utilizing a multiple access channel (MAC). In various embodiments, the MAC can be (but is not limited to) a Gaussian MAC or a discrete memoryless MAC. Encoder one 302 connects to MAC 320 via connection 322. Similarly, encoder two 306 connects to MAC 320 via connection 324. In several embodiments, a cellular tower as described above with respect to FIG. 1 can transmit information utilizing a MAC. It should readily be apparent that embodiments of the invention are not limited to cellular telephone networks and other implementations can be utilized as appropriate to the requirements of specific communication networks. Decoder 326 receives information from MAC 320 via connection 328. Decoder 326 generates decoded message one 330 and decoded message two 332.

Although a variety of cooperation facilitator systems are described above with reference to FIG. 3, any of a variety of networks utilizing cooperation facilitators to improve data transmission can be utilized as appropriate to the requirements of specific applications in accordance with various embodiments of the invention. Cooperation Facilitator controllers are described below.

Cooperation Facilitator Controllers

Figure 4:
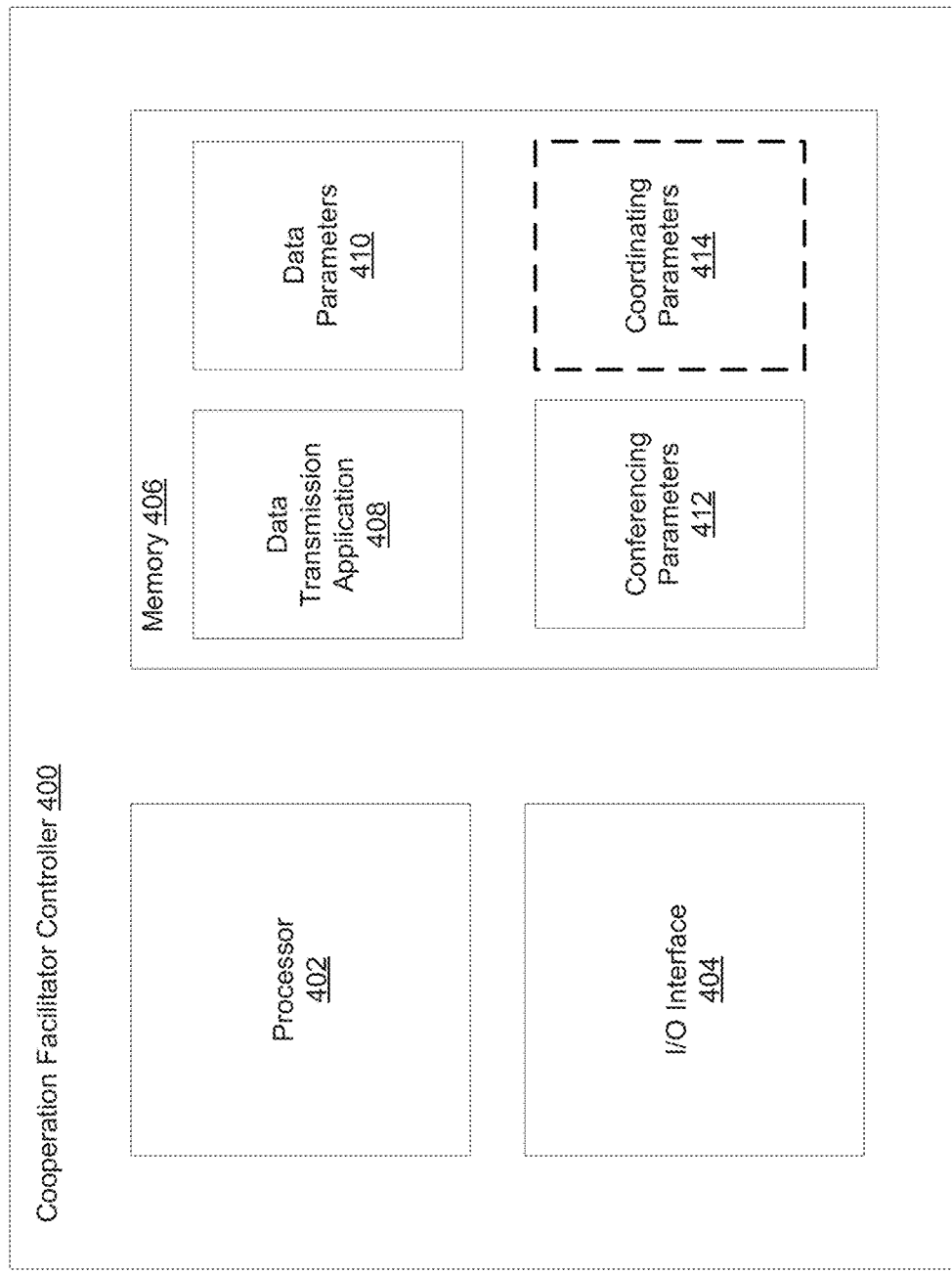
FIG. 4 is a block diagram illustrating a cooperation facilitator controller for data transmission applications in accordance with an embodiment of the invention.

Cooperation Facilitator controllers which implement data transmission applications in accordance with many embodiments of the invention are described in FIG. 4. In several embodiments, Cooperation Facilitator (CF) controller 400 can coordinate the transmission of data among nodes in a network to improve performance including rate and/or reliability. The CF controller includes at least one processor 402, an I/O interface 404, and memory 406. In many embodiments, the memory 406 includes software including data transmission application 408, as well as data parameters 410, conferencing parameters 412, and coordinating parameters 412. In several embodiments, data parameters 410 can include part of the message data from each node (or encoder) that is being encoded by the system. Conferencing parameters 412 can include information passed unaltered from one node to another through the CF controller. Coordinating parameters are generated by the CF to enable coordinated data transmission. Generally they enable encoders within a system to create dependence among independently generated codewords. In many embodiments, the results of rate-distortion theory can be utilized to generate coordinating parameters. Data parameters, conferencing parameters, and coordinating parameters will be discussed in greater detail below. Although a variety of CF controllers are described above with reference to FIG. 4, any of a variety of controllers for cooperative data transmission can be utilized as appropriate to the requirements of specific applications in accordance with embodiments of the invention. Processes for cooperative data transmission will be discussed below.

Coordinated Data Transmission Processes

Figure 5:
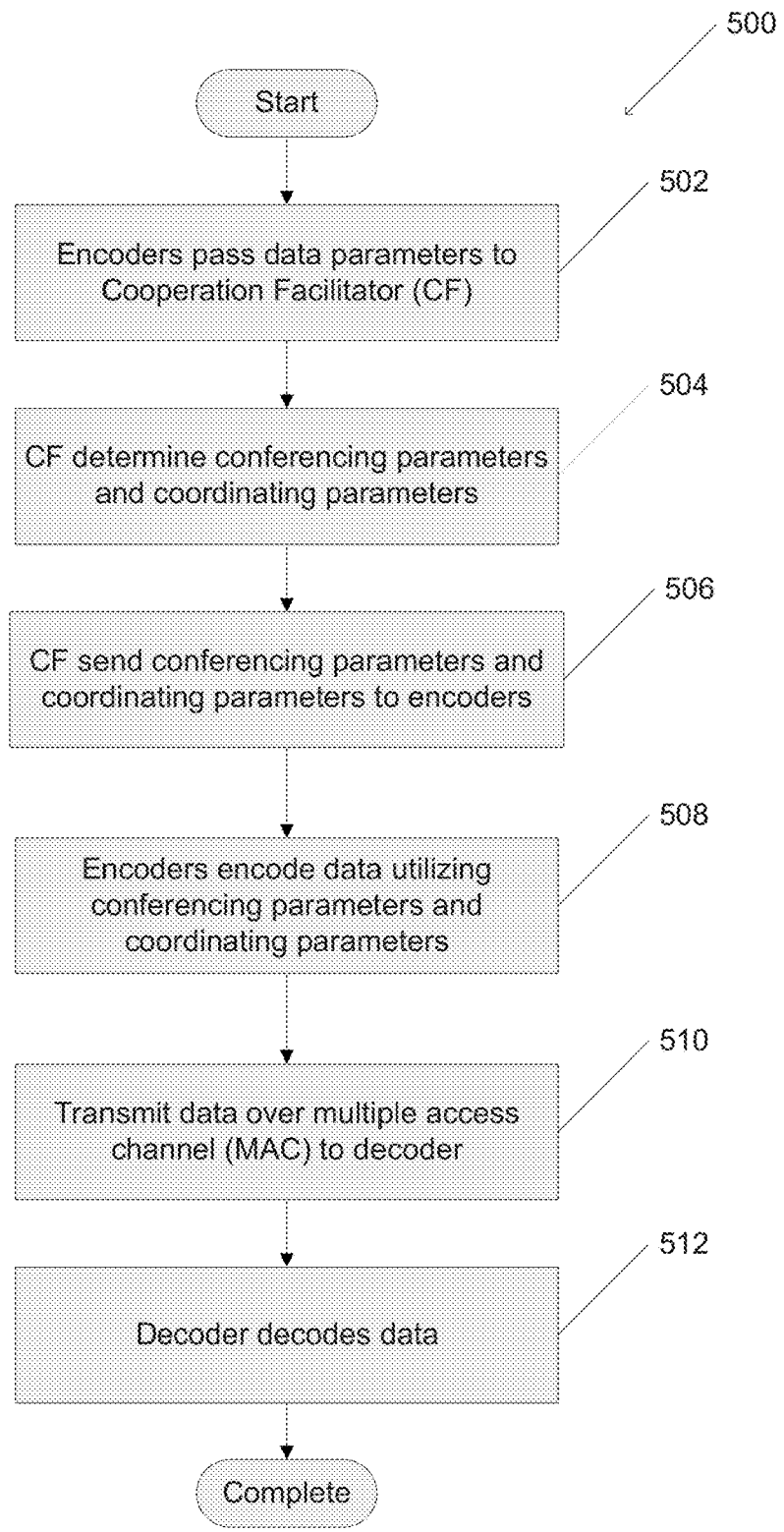
FIG. 5 is a flow chart illustrating a coordinated data transmission process in accordance with an embodiment of the invention.

An overview of a coordinated data transmission process 500 that utilizes a cooperation facilitator in accordance with several embodiments of the invention is illustrated in FIG. 5. Data parameters are passed 502 from encoders to the cooperation facilitator. Generally, data parameters are part of the messages being encoded by the system. In various embodiments two encoders are utilized. A CF system utilizing two encoders will be described in greater detail below. In several other embodiments, more than two encoders are utilized. A CF system utilizing more than two encoders will also be described in greater detail below. The CF determines 504 conferencing parameters and coordinating parameters. Conferencing parameters are generally pieces of data passed unaltered between encoders through the CF, and will be discussed further below. Coordinating parameters are generated by the CF to enable coordinated data transmission. Generally they enable encoders within a system to create dependence among independently generated codewords. In many embodiments, the results of rate-distortion theory can be utilized to generate coordinating parameters. The generation of coordinating parameters will be discussed in greater detail below. The CF sends 506 conferencing parameters and coordinating parameters to encoders. Encoders encode 508 message data utilizing conferencing parameters and coordinating parameters in addition to portions of the input message that do not pass through the CF. Data is transmitted 510 over a multiple access channel (MAC) to one or more decoders. The decoder decodes 512 the data to reconstruct the message data.

In many embodiments, the use of a CF can improve data transmission. In some embodiments, for example in noisy environments, the rate of data transmission can be increased. In many other embodiments, the reliability of data transmission can be increased. Increase in data rate and increase in data reliability will be discussed in further detail below. Although a variety of data transmission processes are described above with reference to FIG. 5, any of a variety of processes for coordinated data transmission can be utilized as appropriate to the requirements of specific applications in accordance with embodiments of the invention. Cooperation Facilitator processes are described below.

Cooperation Facilitator Processes

Figure 6:
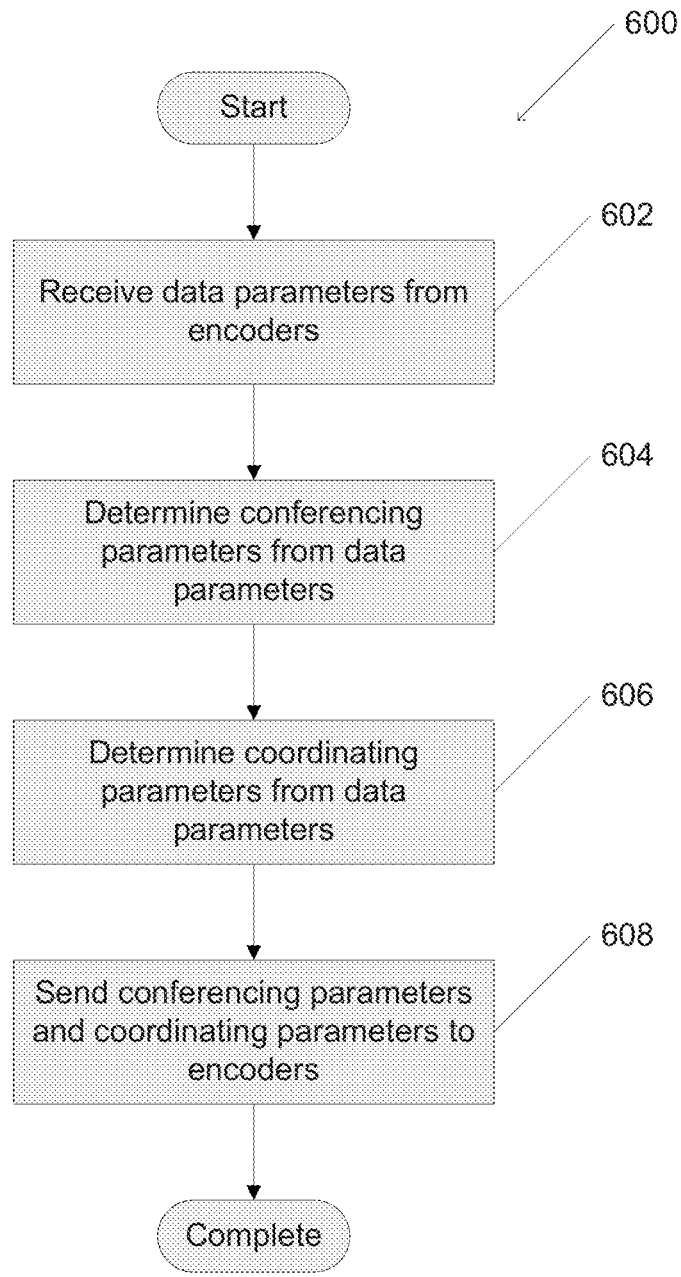
FIG. 6 is a flow chart illustrating a cooperation facilitator process in accordance with an embodiment of the invention.

A cooperation facilitator process 600 that can be performed by a cooperation facilitator node to coordinate data transmission in accordance with an embodiment of the invention is illustrated in FIG. 6. The CF receives 602 data parameters from encoders. Conferencing parameters are determined 604 from data parameters. In many embodiments, conferencing parameters pieces of data passed unaltered between encoders through the CF, and will be discussed further below. Coordinating parameters are determined 606 from data parameters. In several embodiments, coordinating parameters are generated by the CF to enable coordinated data transmission within the system. Generally they enable encoders within a system to create dependence among independently generated codewords, and are discussed in greater detail below. Conferencing parameters and coordinating parameters are sent 608 to encoders. In various embodiments, two encoders are utilized. In many embodiments, more than two encoders are utilized. Specific details for applications with two encoders and more than two encoders are discussed in greater detail below. Although a variety of cooperation facilitator processes are described above with reference to FIG. 6, any of a variety of processes to coordinate cooperation in a data transmission network can be utilized as appropriate to the requirements of specific applications in accordance with embodiments of the invention. Encoding processes are described below.

Encoding Processes

Figure 7:
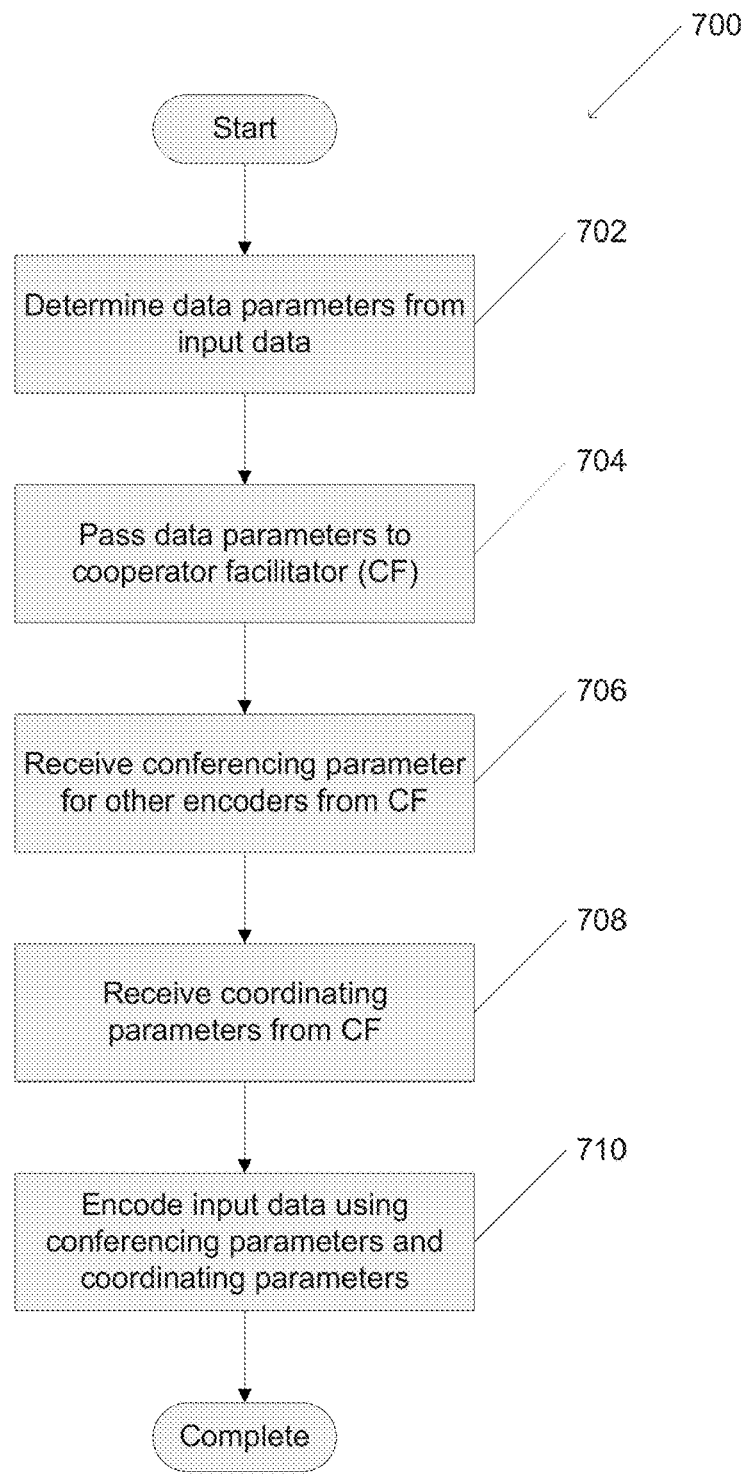
FIG. 7 is a flow chart illustrating an encoding process in accordance with an embodiment of the invention.

An encoding process 700 that utilizes data from a cooperation facilitator in accordance with various embodiments of the invention is illustrated in FIG. 7. Data parameters are determined 702 from input data. Input data generally is the message and/or messages to be encoded. Data parameters, which will be described in greater detail below, are portions of message data passed to the CF and are utilized in the cooperation facilitator process. Data parameters are passed 704 to the CF. Conferencing parameters are received 706 from other encoders which are passed via the CF. In many embodiments, conferencing parameters pieces of data passed unaltered between encoders through the CF, and will be discussed further below. Coordinating parameters are received 708 from the CF. In several embodiments, coordinating parameters are generated by the CF to enable coordinated data transmission within the system. Generally they enable encoders within a system to create dependence among independently generated codewords. Conferencing parameters and coordinating parameters will be discussed in greater detail below. Input data is encoded 710 using conferencing parameters and coordinating parameters in addition to the remaining portions of input data not passed through the CF. In some embodiments, systems utilize two encoders. In many other embodiments, systems utilize more than two encoders. Systems with two encoders and more than two encoders will be described in detail below. Although a variety of encoding processes are described above with reference to FIG. 7, a variety of processes to coordinate data transmission can be utilized as appropriate to the requirements of specific applications in accordance with embodiments of the invention.

1. Gaussian Multiple Access Channels

In several embodiments of the invention, in cooperative coding schemes network nodes work together to achieve higher transmission rates. To obtain a better understanding of cooperation, consider an embodiment of the invention in which two transmitters send rate-limited descriptions of their messages to a "cooperation facilitator", a node that sends back rate-limited descriptions of the pair to each transmitter. This embodiment of the invention includes the conferencing encoders model. It can be shown that except for a special class of multiple access channels, the gain in sum-capacity resulting from cooperation under this model is quite large. Adding a cooperation facilitator to any such channel results in a network that does not satisfy the edge removal property. That is, removing a connection of capacity C may decrease the sum-capacity of the network by more than the capacity C. An important special case in accordance with many embodiments of the invention is the Gaussian multiple access channel, for which the sum-rate cooperation gain will be explicitly characterized below.

To meet the growing demand for higher transmission rates, network nodes should employ coding schemes that use scarce resources in a more efficient manner. By working together, network nodes can take advantage of under-utilized network resources to help data transmission in heavily constrained regions of the network. Cooperation among nodes emerges as a natural strategy towards this aim.

As an illustrative example, consider two nodes. A and B, transmitting independent messages over a network N. A third node C that has bidirectional links to A and B can help A and B work together to achieve a higher sum-rate than they would have achieved had they worked separately.

In various embodiments, an understanding of how the gain in sum-rate resulting from cooperation between A and B relates to the capacities of the links from (A,B) to C and back is important. Intuitively, the increase in sum-rate can be thought of as the benefit of cooperation and the capacities of the links between (A,B) and C as the cost of cooperation. See FIG. 2 as described above, which illustrates cooperation among network nodes. Node C enables nodes A and B to cooperate and potentially achieve higher rates in the transmission of their messages over network N.

To study this embodiment of the invention formally, let A and B be the encoders of a memoryless multiple access channel (MAC). Let C be a "cooperation facilitator" (CF), a node which, prior to the transmission of the messages over the network, receives a rate-limited description of each encoder's message and sends a rate-limited output to each encoder. See FIG. 3 as described above which illustrates a network for the MAC with a CF.

In one-step cooperation, each encoder sends a function of its message to the CF and the CF transmits, to each encoder, a value that is a function of both of its inputs. Similarly, k-step cooperation (for a fixed positive integer k) can be defined between the CF and the encoders where the information transmission between the CF and each encoder continues for k steps, with the constraint that the information that the CF or each encoder transmits in each step only depends on the information that it previously received. Only one-step cooperation is used for simplicity in the achievability result.

The CF of several embodiments of the invention extends the cooperation model to allow for rate-limited inputs. While the CF in earlier approaches has full knowledge of both messages and transmits a rate-limited output to both encoders, the more general CF of many embodiments of the invention only has partial knowledge of each encoder's message. In addition, the CF can be allowed to send a different output to each encoder.

There exists a discrete memoryless MAC where encoder cooperation through a CF results in a large gain (with respect to the capacities of the output edges of the CF). This implies the existence of a network consisting of a MAC with a CF that does not satisfy the "edge removal property". A network satisfies the edge removal property if removing an edge from that network does not reduce the achievable rate of any of the source messages by more than the capacity of that edge. A question exists as to whether such a result is true for more natural channels, e.g., the Gaussian MAC. The answer turns out to be positive, and except for a special class of MACs, adding a CF results in a large sum-capacity gain.

An achievability scheme in accordance with many embodiments of the present invention combines three coding schemes via rate splitting. First, each encoder sends part of its message to the CF. The CF passes on part of what it receives from each encoder to the other encoder without any further operations. In this way the CF enables "conferencing" between the encoders, which is a cooperation strategy.

The CF uses the remaining part of what it receives to help the encoders "coordinate" their transmissions; that is, it enables the encoders to create dependence among independently generated codewords. For this coordination strategy, results from rate-distortion theory can be relied upon to obtain an inner bound for the capacity region of the broadcast channel.

Finally, for the remaining part of the messages, which do not go through the CF, the encoders can use a classical coding scheme. The achievable scheme is more formally introduced below and its performance is studied further below. An inner bound for the Gaussian MAC is provided. The sum-rate gain of the inner bound is compared with the sum-rate gain of other schemes. No other scheme alone performs as well as combinations in accordance with many embodiments of the inventions.

1.1 Cooperation Models

Let $(X_1 \times X_2, P(y|x_1,x_2), Y)$ denote a memoryless MAC. Suppose $W_1$ and $W_2$ are the messages that encoders 1 and 2 transmit, respectively. For every positive integer k, define $[k]=\{1,\ldots,k\}$. Assume that $W_1$ and $W_2$ are independent and uniformly distributed over the sets $[M_1]$ and $[M_2]$, respectively.

For i=1,2, represent encoder i by the mappings $$\varphi_i:[M_i] \to [2^{nC_i^{in}}]$$

$$f_i:[M_i] \times [2^{nC_i^{out}}] \to X_i^n$$

that describe the transmissions to the CF and channel, respectively. Represent the CF by the mappings $$\psi_i:[2^{nC_1^{in}}] \times [2^{nC_2^{in}}] \to [2^{nC_i^{out}}],$$

where $\psi_i$ denotes the output of the CF to encoder i for i=1,2. Under this definition, when $(W_1, W_2)=(w_1, w_2)$, the CF receives $\varphi_1(w_1)$ and $\varphi_2(w_2)$ from encoders 1 and 2, respectively. The CF then sends $\psi_1(\varphi_1(w_1), \varphi_2(w_2))$ to encoder 1 and $\psi_2(\varphi_1(w_1), \varphi_2(w_2))$ to encoder 2.

Represent the decoder by the mapping $$g:Y^n \to [M_1] \times [M_2].$$

Then the probability of error is given by $$P_e^{(n)}=P\{g(Y^n) \neq (W_1,W_2)\}.$$

Define $C^{in}=(C_1^{in},C_2^{in})$ and $C^{out}=(C_1^{out},C_2^{out})$. Call the mappings $(\varphi_1,\varphi_2,\psi_1,\psi_2,f_1,f_2,g)$ an $(n,M_1,M_2)$ code for the MAC with a $(C^{in},C^{out})$-CF. For nonnegative real numbers $R_1$ and $R_2$, say that the rate pair $(R_1,R_2)$ is achievable if for every $\varepsilon>0$ and sufficiently large n, there exists an $(n, M_1, M_2)$ code such that $P_e^{(n)} \leq \varepsilon$ and $$\frac{1}{n}\log M_i > R_i - \varepsilon,$$

for i=1,2. We define the capacity region as the closure of the set of all achievable rate pairs $(R_1,R_2)$ and denote it by $\mathscr{C}(C^{in},C^{out})$.

Using the capacity region of the MAC with conferencing encoders, obtain inner and outer bounds for the capacity region of a MAC with a CF. Let $\mathscr{C}_{conf}(C_{12},C_{21})$ denote the capacity region of a MAC with a $(C_{12},C_{21})$ conference. Since the conferencing capacity region can be achieved with a single step of conferencing, it follows that $$\mathscr{C}_{conf}(\min\{C_1^{in},C_2^{out}\},\min\{C_2^{in},C_1^{out}\})$$

is an inner bound for $\mathscr{C}(C^{in},C^{out})$. In addition, since each encoder could calculate the CF output if it only knew what the CF received from the other encoder, $\mathscr{C}_{conf}(C_1^{in},C_2^{in})$ is an outer bound for $\mathscr{C}(C^{in},C^{out})$. Henceforth refer to these inner and outer bounds as the conferencing bounds. Note that when $C_2^{out} \geq C_1^{in}$ and $C_1^{out} \geq C_2^{in}$, the conferencing inner and outer bounds agree, giving $$\mathscr{C}(C^{in},C^{out}) = \mathscr{C}_{conf}(C_1^{in},C_2^{in}).$$

Next discuss the main result of this section. For any memoryless MAC $(X_1 \times X_2, P(y|x_1,x_2), Y)$ with a $(C^{in},C^{out})$-CF, define the sum-capacity as $$C_{sum} = \max_{\mathscr{C}(C_{in},C_{out})} (R_1+R_2).$$

For a fixed $C_{in}$ with $\min\{C_1^{in},C_2^{in}\}>0$, define the "sum-capacity gain" $G: \mathbb{R}_{\geq 0} \to \mathbb{R}_{\geq 0}$ as $$G(C_{out}) = C_{sum}(C^{in},C^{out}) - C_{sum}(C^{in},0),$$

where $C_{out} = (C_{out}, C_{out})$ and $0=(0,0)$. Note that when $C_{out}=0$, no cooperation is possible, thus $$C_{sum}(C^{in},0) = \max_{P(x_1)P(x_2)} I(X_1,X_2;Y).$$

It can be proven that for any MAC where using dependent codewords (instead of independent ones) results in an increase in sum-capacity, the effect of cooperation through a CF can be quite large. In particular, it shows that the network consisting of any such MAC and a CF does not satisfy the edge removal property.

Theorem 1 (Sum-capacity). For any discrete memoryless MAC $(X_1 \times X_2, P(y|x_1,x_2), Y)$ that satisfies $$\max_{P(x_1,x_2)} I(X_1,X_2;Y) > \max_{P(x_1)P(x_2)} I(X_1,X_2;Y),$$

we have $G'(0)=\infty$. For the Gaussian MAC, a stronger result holds: For some positive constant $\alpha$ and sufficiently small $C_{out}$, $$G(C_{out}) \geq \alpha \sqrt{C_{out}}.$$

The proof of Theorem 1 can be found in Parham Noorzad, Michelle Effros, and Michael Langberg, On the Cost and Benefit of Cooperation (Extended Version), arxiv.org/abs/1504.04432, 17 Apr. 2015, which is hereby incorporated by reference in its entirety, and is based on an achievability result for the MAC with a CF, which is next described. Define $$\mathscr{R}(C^{in},C^{out})$$

as the set of all rate pairs $(R_1,R_2)$ that for $(i,j)\in\{(1,2),(2,1)\}$ satisfy $$R_i < I(X_i;Y|U,V_1,V_2,X_j) + C_i^{in}$$

$$R_i < I(X_i;Y|U,V_j,X_j) + C_{i0}$$

$$R_1+R_2 < I(X_1,X_2;Y|U,V_1,V_2) + C_1^{in} + C_2^{in}$$

$$R_1+R_2 < I(X_1,X_2;Y|U,V_i) + C_i^{in} + C_{j0}$$

$$R_1+R_2 < I(X_1,X_2;Y|U) + C_{10} + C_{20}$$

$$R_1+R_2 < I(X_1,X_2;Y),$$

for nonnegative constants $C_{10}$ and $C_{20}$, and distributions $P(u,v_1,v_2)P(x_1|u,v_1)P(x_2|u,v_2)$ that satisfy $$C_{i0} \leq \min\{C_i^{in}, C_j^{out}\}$$

$$I(V_1;V_2|U) \leq (C_1^{out}-C_{20}) + (C_2^{out}-C_{10}). \quad (1)$$

In the above definition, the pair $(U, V_i)$ represents the information encoder i receives from the CF. In addition, the pair $(C_{10},C_{20})$ indicates the amount of rate being used on the CF links to enable the conferencing strategy. The remaining part of rate on the CF links is used to create dependence between $V_1$ and $V_2$.

Theorem 2 (Achievability). For any memoryless MAC $(X_1 \times X_2, P(y|x_1,x_2), Y)$ with a $(C^{in},C^{out})$-CF, the rate region $\mathscr{R}(C^{in},C^{out})$ is achievable.

A nontrivial special case is the case where the CF has complete knowledge of both source messages, that is, $C_1^{in}=C_2^{in}=\infty$. In this case, it is not hard to see in Parham Noorzad, Michelle Effros, and Michael Langberg, On the Cost and Benefit of Cooperation (Extended Version), arxiv.org/abs/1504.04432, 17 Apr. 2015, which is hereby incorporated by reference in its entirety, that $\mathscr{R}(C^{in},C^{out})$ simplifies to the set of all nonnegative rate pairs $(R_1,R_2)$ that satisfy $$R_1 < I(X_1;Y|U,X_2) + C_{10}$$

$$R_2 < I(X_2;Y|U,X_1) + C_{20}$$

$$R_1+R_2 < I(X_1,X_2;Y|U) + C_{10} + C_{20}$$

$$R_1+R_2 < I(X_1,X_2;Y),$$

for nonnegative constants $C_{10} \leq C_2^{out}$ and $C_{20} \leq C_1^{out}$, and distributions $P(u,x_1,x_2)$ with $$I(X_1;X_2|U) \leq (C_1^{out}-C_{20}) + (C_2^{out}-C_{10}).$$

Note that in this case, increasing the number of cooperation steps does not change the family of functions the CF can compute. Thus as with the case where $C_1^{in} \leq C_2^{out}$ and $C_2^{in} \leq C_1^{out}$, using more than one step for cooperation does not enlarge the capacity region.

The rate region, $\mathscr{R}(C^{in},C^{out})$, in addition to being achievable, is also convex. To prove this, we show a slightly stronger result. For every $\lambda \in (0,1)$, $(C_a^{in},C_a^{out})$, and $(C_b^{in},C_b^{out})$, define $$\mathscr{R}_\lambda = \mathscr{R}(\lambda C_a^{in}+(1-\lambda)C_b^{in}, \lambda C_a^{out}+(1-\lambda)C_b^{out}).$$

Also define $\mathscr{R}_a = \mathscr{R}(C_a^{in},C_a^{out})$ and $\mathscr{R}_b = \mathscr{R}(C_b^{in},C_b^{out})$. We then have the following result.

Theorem 3 (Convexity). For any $\lambda \in (0,1)$, $$\mathscr{R}_\lambda \supseteq \lambda \mathscr{R}_a + (1-\lambda) \mathscr{R}_b.$$

The addition in Theorem 3 is the Minkowski sum, defined for any two subsets A and B of $\mathbb{R}^2$ as $$A+B=\{(a_1+b_1,a_2+b_2)|(a_1,a_2)\in A, (b_1,b_2)\in B\}.$$

Set $C_a^{in}=C_b^{in}$ and $C_a^{out}=C_b^{out}$ in Theorem 3 to get $\mathscr{R}\supseteq\lambda\mathscr{R}+(1-\lambda)\mathscr{R}$, which is equivalent to the convexity of $\mathscr{R}$. Using a time-sharing argument, see that the capacity region $\mathscr{C}(C^{in},C^{out})$ also satisfies the property stated in Theorem 3. Theorem 3 is proved in Parham Noorzad, Michelle Effros, and Michael Langberg, *On the Cost and Benefit of Cooperation* (Extended Version), arxiv.org/abs/1504.04432, 17 Apr. 2015, which is hereby incorporated by reference in its entirety.

1.2 The Achievability Scheme

In this section, a formal description of a coding scheme that can be utilized in many embodiments of the invention is given. First, pick nonnegative constants $C_{10}$ and $C_{20}$ such that Equation (1) holds for $\{i,j\}=\{1,2\}$. In achievability scheme, the first $nC_{i0}$ bits of $W_i$ are sent directly from encoder $i$ to encoder $j$ through the CF without any modification. Thus require $C_{i0}$ to satisfy inequality (1).

Next, choose $C_{1d}$ and $C_{2d}$ such that $$C_{1d}\leq C_1^{out}-C_{20}$$

$$C_{2d}\leq C_2^{out}-C_{10}. \quad (2)$$

The values of $C_{1d}$ and $C_{2d}$ specify the amount of rate used on each of the output links for the coordination strategy. Finally, choose an input distribution $P(u,v_1,v_2)P(x_1|u,v_1)P(x_2|u,v_2)$ so that $P(u,v_1,v_2)$ satisfies $$\zeta:=C_{1d}+C_{2d}-I(V_1;V_2|U)>0. \quad (3)$$

Fix $\varepsilon>0$. Let $A_\varepsilon^{(n)}$ be the weakly typical set with respect to the distribution $$P(u,v_1,v_2)P(x_1|u,v_1)P(x_2|u,v_2)P(y|x_1,x_2).$$

By Cramér's large deviation theorem, there exists a nondecreasing function $\Theta: \mathbb{R}^+\to\mathbb{R}^+$ such that $$P\{(A_\varepsilon^{(n)})^c\}\leq 2^{-n\Theta(\varepsilon)}. \quad (4)$$

Fix $\delta>0$ and let $A_\delta^{(n)}$ denote the weakly typical set with respect to $P(u,v_1,v_2)$. Make use of the typical sets $A_\delta^{(n)}$ and $A_\varepsilon^{(n)}$ in the encoding and decoding processes, respectively.

Next the codebook generation is described. For $i=1,2$, let $M_i=\lfloor 2^{nR_i}\rfloor$ and define $R_{i0}=\min\{R_i,C_{i0}\}$, $R_{id}=\min\{R_i,C_i^{in}\}-R_{i0}$, and $R_{ii}=(R_i-C_i^{in})^+$, where for any real number $x, x^+=\max\{x,0\}$. Note that for $i=1,2$, $R_i=R_{i0}+R_{id}+R_{ii}$, thus each of the messages can be split into three parts as $$W_i=(W_{i0},W_{id},W_{ii})\in[2^{nR_{i0}}]\times[2^{nR_{id}}]\times[2^{nR_{ii}}].$$

Here $W_{10}$ and $W_{20}$ are used for conferencing. $W_{1d}$ and $W_{2d}$ are used for coordination, and $W_{11}$ and $W_{22}$ are transmitted over the channel independently.

Next, for every $(w_{10},w_{20})\in[2^{n(R_{10}+R_{20})}]$, generate $U^n(w_{10},w_{20})$ i.i.d. with the distribution $$P\{U^n(w_{10},w_{20})=u^n\}=\prod_{t=1}^n P(u_t).$$

Let $E(u^n)$ be the event $\{U^n(w_{10},w_{20})=u^n\}$. Given $E(u^n)$, for every $(w_{id},z_i)\in[2^{nR_{id}}]\times[2^{nC_{id}}]$, generate $V_i^n(w_{id},z_i|u^n)$ according to $$P\{V_i^n(w_{id},z_i|u^n)=v_i^n\mid E(u^n)\}=\prod_{t=1}^n P(v_{it}|u_t),$$

for $i=1,2$, where $P(v_1|u)$ and $P(v_2|u)$ are marginals of $P(v_1,v_2|u)$.

Fix $(w_{10},w_{20},w_{1d},w_{2d})$ and functions $$v_i:[2^{nC_{id}}]\to\mathcal{V}_i^n;$$

for $i=1,2$. Let $E(u^n,v_1,v_2)$ denote the event where $U^n(w_{10},w_{20})=u^n$ and $V_1^n(w_{1d},\bullet|u^n)=v_1(\bullet)$, and $V_2^n(w_{2d},\bullet|u^n)=v_2(\bullet)$. In addition, for any $u^n, v_1$, and $v_2$, define the set $$\mathcal{A}(u^n,v_1,v_2):=\{(z_1,z_2):(u^n,v_1(z_1),v_2(z_2))\in A_\delta^{(n)}\}.$$

Given $E(u^n,v_1,v_2)$, if $\mathcal{A}(u^n,v_1,v_2)$ is nonempty, define $$(Z_1(u^n,v_1,v_2),Z_2(u^n,v_1,v_2))$$

as a random pair that is uniformly distributed on $\mathcal{A}(u^n,v_1,v_2)$. Otherwise, set $Z_i(u^n,v_1,v_2)=1$ for $i=1,2$.

Next, fix $(w_{10},w_{20},w_{1d},w_{2d})$ and let $E(u^n,v_1^n,v_2^n)$ denote the event where $U^n(w_{10},w_{20})=u^n$, $V_1^n(w_{1d},Z_1|u^n)=v_1^n$ and $V_2^n(w_{2d},Z_2|u^n)=v_2^n$. For every $w_{11}$ and $w_{22}$, generate the codewords $X_1^n(w_{11}|u^n,v_1^n)$ and $X_2^n(w_{22}|u^n,v_2^n)$ independently according to the distributions $$P\{X_i^n(w_{ii}|u^n,v_i^n)=x_i^n\mid E(u^n,v_1^n,v_2^n)\}=\prod_{t=1}^n P(x_{it}|u_t,v_{it})$$

for $i=1,2$. This completes our codebook construction.

Next, the encoding and decoding operations are described. Suppose $W_1=(w_{10},w_{1d},w_{11})$ and $W_2=(w_{20},w_{2d},w_{22})$. Encoders 1 and 2 send the pairs $(w_{10},w_{1d})$ and $(w_{20},w_{2d})$, respectively, to the cooperation facilitator. Thus for $i=1,2$, $\varphi_i(w_i)=(w_{i0},w_{id})$. The cooperation facilitator then transmits $$\psi_1(\varphi_1(w_1),\varphi_2(w_2))=(w_{20},Z_1)$$

$$\psi_2(\varphi_1(w_1),\varphi_2(w_2))=(w_{10},Z_2),$$

to encoders 1 and 2, respectively.

Using its knowledge of $(w_1,w_{20},Z_1)$, encoder 1 uses the $(U^n,V_1^n)$-codebook to transmit $X_1^n(w_{11}|U^n,V_1^n)$. Similarly, using knowledge obtained from the cooperation facilitator, encoder 2 transmits $X_2^n(w_{22}|U^n,V_2^n)$. It is worth noting that using the cooperation facilitator to transmit $Z_1$ and $Z_2$ is superior to simply having one of the encoders act as the cooperation facilitator, because the encoders can receive $Z_1$ and $Z_2$ without either encoder incurring the penalty in terms of loss of capacity associated with transmitting $Z_1$ and $Z_2$. That penalty is incurred by the cooperation facilitator, which is chosen due to it having idle capacity.

The decoder uses joint typicality decoding. Upon receiving $Y^n$ the decoder looks for a unique pair $(w_1,w_2)$ such that $$(U^n(w_{10},w_{20}),V_1^n(w_{1d},Z_1),V_2^n(w_{2d},Z_2),$$

$$X_1^n(w_{11}),X_2^n(w_{22}),Y^n)\in A_\varepsilon^{(n)}. \quad (5)$$

If such a $(w_1,w_2)$ doesn't exist or exists but is not unique, the decoder declares an error. Although specific processes are described above for generating codes, as can readily be appreciated, other processes can be utilized to generate codes and code books that enable simple implementation of encoders and/or low latency encoding performance as appropriate to the requirements of specific applications in accordance with various embodiments of the invention.

1.3 Error Analysis

In this section, the achievability scheme is studied more closely and sufficient conditions are provided for $(R_1,R_2)$ such that the probability of error goes to zero. This immediately leads to Theorem 9 which characterizes an achievable rate region for the MAC with transmitter cooperation.

Suppose the message pair $(w_1,w_2)$ is transmitted, where $w_i=(w_{i0},w_{id},w_{ii})$. If $(w_1,w_2)$ is the unique pair that satisfies Equation (5) then there is no error. If such a pair does not exist or is not unique, an error occurs. This event can be denoted by $\varepsilon$. Since directly finding an upper bound on $P(\varepsilon)$ is not straightforward. $\varepsilon$ can be upper bound by the union of a finite number of events and then apply the union bound. Detailed proofs of the bounds mentioned in this section are given in Parham Noorzad. Michelle Effros, and Michael Langberg. *On the Cost and Benefit of Cooperation (Extended Version)*, arxiv.org/abs/1504.04432, 17 Apr. 2015, which is hereby incorporated by reference in its entirety.

In what follows, denote $U^n(w_{10},w_{20})$ and $V_i^n(W_{id},\bullet|U^n)$ by $U^n$ and $V_i^n(\bullet)$, respectively. In addition, define $$X_i^n(\bullet)=X_i^n(w_{ii}|U^n,V_i^n(\bullet)).$$

Furthermore, denote instances of $V_i^n(\bullet)$ and $X_i^n(\bullet)$ with $v_i(\bullet)$ and $X_i(\bullet)$, respectively. Also write $V_i^n$ and $X_i^n$ instead of $V_i^n(w_{id},Z_i|U^n)$ and $X_i^n(w_{ii}|U^n,V_i^n)$.

Denote the output of the decoder with $(\hat{w}_1,\hat{w}_2)$. Denote $U^n(\hat{w}_{10},\hat{w}_{20})$ with $\hat{U}^n$ and similarly define $\hat{V}_i^n$ and $\hat{X}_i^n$ for $i=1,2$.

Next describe the error events. First, define $\varepsilon_0$ as $$\varepsilon_0=\{(U^n,V_1^n,V_2^n)\notin A_\delta^{(n)}\}. \quad (6)$$

When $\varepsilon_0$ does not occur, the CF transmits $(w_{20},Z_1)$ and $(w_{10},Z_2)$ to encoders 1 and 2, respectively, which correspond to a jointly typical triple $(U^n,V_1^n,V_2^n)$. Using Mutual Covering Lemma for weakly typical sets is described in Parham Noorzad. Michelle Effros, and Michael Langberg, *On the Cost and Benefit of Cooperation (Extended Version)*, arxiv.org/abs/1504.04432, 17 Apr. 2015, which is hereby incorporated by reference in its entirety, it can be shown that $P(\varepsilon_0)$ goes to zero if $\zeta>4\varepsilon$, where $\zeta$ is defined by Equation (3).

Next, define $\varepsilon_1$ as $$\varepsilon_1=\{(U^n,V_1^n,V_2^n,X_1^n,X_2^n,Y^n)\notin A_\varepsilon^{(n)}\}.$$

This is the event where the codewords of the transmitted message pair are not jointly typical with the received output $Y^n$. Then. $P(\varepsilon_1\backslash\varepsilon_0)\to 0$ as $n\to\infty$ if $\zeta<\Theta(\varepsilon)-4\delta$.

If an error occurs and $\varepsilon_1^c$ holds, there must exist a message pair $(\hat{w}_1,\hat{w}_2)$ different from $(w_1,w_2)$ that satisfies (5). The message pair $(\hat{w}_1,\hat{w}_2)$, where $\hat{w}_i=(\hat{w}_{i0},\hat{w}_{id},\hat{w}_{ii})$, may have $(\hat{w}_{10},\hat{w}_{20})\neq(w_{10},w_{20})$ or $(\hat{w}_{10},\hat{w}_{20})=(w_{10},w_{20})$.

Define $\varepsilon_U$ as the event where $(\hat{w}_{10},\hat{w}_{20})\neq(w_{10},w_{20})$. In this case, $(\hat{U}^n,\hat{V}_1^n,\hat{V}_2^n,\hat{X}_1^n,\hat{X}_2^n)$ and $Y^n$ are independent, which implies that $P(\varepsilon_U)$ goes to zero if $R_1+R_2<I(X_1,X_2;Y)-\zeta-7\varepsilon$.

If $(\hat{w}_{10},\hat{w}_{20})=(w_{10},w_{20})$, then either $(\hat{w}_{1d},\hat{w}_{2d})\neq(w_{1d},w_{2d})$ or $(\hat{w}_{1d},\hat{w}_{2d})=(w_{1d},w_{2d})$. If $(\hat{w}_{1d},\hat{w}_{2d})\neq(w_{1d},w_{2d})$, then $\hat{w}_{1d}\neq w_{1d}$ but $\hat{w}_{2d}=w_{2d}$, or $\hat{w}_{2d}\neq w_{2d}$ but $\hat{w}_{1d}=w_{1d}$, or $\hat{w}_{1d}\neq w_{1d}$ and $\hat{w}_{2d}\neq w_{2d}$.

Let $(i,j)\in\{(1,2),(2,1)\}$. If $\hat{w}_{id}\neq w_{id}$ and $\hat{w}_{jd}=w_{jd}$, it may be $\hat{w}_{jj}=w_{jj}$ or $\hat{w}_{jj}=w_{jj}$. Denote the former event by $\varepsilon_{V_iX_j}$ and the latter by $\varepsilon_{V_i}$. Finally, denote the event where $\hat{w}_{1d}\neq w_{1d}$ and $\hat{w}_{2d}\neq w_{2d}$ with $\varepsilon_{V_1V_2}$.

For $(i,j)\in\{(1,2),(2,1)\}$, when $\varepsilon_{V_iX_j}$ occurs, $(\hat{V}_1^n,\hat{V}_2^n,\hat{X}_1^n,\hat{X}_2^n)$ and $Y^n$ are independent given $(U^n,V_j^n(\bullet),X_j^n(\bullet))$. This implies $P(\varepsilon_{V_iX_j})\to 0$ if $(R_i-R_{i0})+R_{jj}<I(X_1,X_2;Y|U,V_j)-\zeta-8\varepsilon$.

For $(i,j)\in\{(1,2),(2,1)\}$, when $\varepsilon_{V_i}$ occurs, it can be shown that $(\hat{V}_1^n,\hat{V}_2^n,\hat{X}_1^n,\hat{X}_2^n)$ and $Y^n$ are independent given $(U^n,V_j^n(\bullet),X_j^n(\bullet))$. This implies $P(\varepsilon_{V_i})\to 0$ if $R_i-R_{i0}<I(X_i;Y|U,V_j,X_j)-\zeta-8\varepsilon$.

If $\varepsilon_{V_1V_2}$ occurs, $(\hat{V}_1^n,\hat{V}_2^n,\hat{X}_1^n,\hat{X}_2^n)$ and $Y^n$ are independent given $U^n$. Thus $P(\varepsilon_{V_1V_2})$ goes to zero if $$(R_1-R_{10})+(R_2-R_{20})<I(X_1,X_2;Y|U)-\zeta-8\varepsilon.$$

Finally, if an error occurs and the message pairs have the same $(w_{10},w_{20})$ and the same $(w_{1d},w_{2d})$, they must have different $(w_{11},w_{22})$. Define the events $\varepsilon_{X_i}$ and $\varepsilon_{X_1X_2}$ similarly to the events for $(w_{1d},w_{2d})$. The relations $$\hat{X}_i^n\to(U^n,V_1^n,V_2^n,X_j^n)\to Y^n$$

$$(\hat{X}_1^n,\hat{X}_2^n)\to(U^n,V_1^n,V_2^n)\to Y^n,$$

hold for the events $\varepsilon_{X_i}$ and $\varepsilon_{X_1X_2}$, respectively. From these relations it follows that $$P(\varepsilon_{X_i})\to 0 \text{ if } R_{ii}<I(X_i;Y|U,V_1,V_2,X_j)-4\varepsilon.$$

$$P(\varepsilon_{X_1X_2})\to 0 \text{ if } R_{11}+R_{22}<I(X_1,X_2;Y|U,V_1,V_2)-4\varepsilon.$$

Not surprisingly, these bounds closely resemble the bounds that appear in the capacity region of the classical MAC.

The bounds given in this section can be simplified further by replacing $R_i-R_{i0}$ and $R_{ii}$ with $(R_i-C_{i0})^+$ and $(R_i-C_i^{in})^+$, respectively, and noting that the set of all $(x,y)$ that satisfy $(x-a)^++(y-b)^+<c$ is the same as the set of all $(x,y)$ that satisfy $x-a<c$, $y-b<c$, and $(x-a)+(y-b)<c$.

Note that the general error event $\varepsilon$ is a subset of the union of the error events defined above. Thus if the union bound is applied and $\delta,\varepsilon$, and $\zeta$ are chosen to be arbitrarily small, we obtain Theorem 9.

1.4 The Gaussian MAC

The Gaussian MAC is defined as the channel $Y_t=X_{1t}+X_{2t}+Z_t$, where $\{Z_t\}_{t=1}^n$ is an i.i.d. Gaussian process independent of $(X_1^n,X_2^n)$ and each $Z_t$ is a Gaussian random variable with mean zero and variance N. In addition, the output power of encoder i is constrained by $P_i$, that is, $\Sigma_{t=1}^n x_{it}^2\leq nP_i$, where $x_{it}$ is the output of encoder i at time t for $i=1,2$.

For the Gaussian MAC, the definition of an achievable rate pair can be modified by adding the encoder power constraints to the definition of the $(n,M_1,M_2)$ code for a MAC with a CF. Then the rate region $\mathscr{R}_{mod}$ is achievable for the Gaussian MAC, where $\mathscr{R}_{mod}$ is the same as $\mathscr{R}$ (Theorem 9) with the additional constraints $\mathbb{E}[X_i^2]\leq P_i$ for $i=1,2$ on the input distribution $P(u,v_1,v_2)P(x_1|u,v_1)P(x_2|u,v_2)$. This follows by replacing entropies with differential entropies and including the input power constraints in the definition of $A_\varepsilon^{(n)}$. This is possible since weakly typical sets are used (rather than strongly typical sets) in the proof of Theorem 9.

If, in the calculation of $\mathscr{R}_{mod}$, we limit ourselves only to Gaussian input distributions, we get a rate region which we denote by $\mathscr{R}_G$. Note that $\mathscr{R}_G$ is an inner bound for the capacity region of a Gaussian MAC with a CF. Denote the signal to noise ratio of encoder i with $$\gamma_i=\frac{P_i}{N}$$

and define $\overline{\gamma}=\sqrt{\gamma_1\gamma_2}$. The rate region $\mathscr{R}_G$ is given by the next theorem.

Theorem 4. For the Gaussian MAC with a $(C_{in},C_{out})$ CF, the achievable rate region $\mathscr{R}_G$ is given by the set of all rate pairs $(R_1,R_2)$ that for $\{i,j\}=\{1,2\}$ satisfy $$R_i < \frac{1}{2}\log(1 + \rho_{ii}^2 \gamma_i) + C_i^{in}$$

$$R_i < \frac{1}{2}\log(1 + \tilde{\rho}_{ii}^2 \gamma_i) + C_{i0}$$

$$R_1 + R_2 < \frac{1}{2}\log(1 + \rho_{11}^2 \gamma_1 + \rho_{22}^2 \gamma_2) + C_1^{in} + C_2^{in}$$

$$R_1 + R_2 < \frac{1}{2}\log(1 + \rho_{ii}^2 \gamma_i + \tilde{\rho}_{jj}^2 \gamma_j) + C_i^{in} + C_{j0}$$

$$R_1 + R_2 <$$
$$\frac{1}{2}\log(1 + (1-\rho_{10}^2)\gamma_1 + (1-\rho_{20}^2)\gamma_2 + 2\rho_0 \rho_{1d} \rho_{2d} \overline{\gamma}) + C_{10} + C_{20}$$

$$R_1 + R_2 < \frac{1}{2}\log(1 + \gamma_1 + \gamma_2 + 2(\rho_{10}\rho_{20} + \rho_0 \rho_{1d}\rho_{2d})\overline{\gamma})$$

for some $\rho_{10}, \rho_{20}, \rho_{1d}, \rho_{2d} \in [0,1]$, and nonnegative constants $C_{10}$ and $C_{20}$ that satisfy Equation (1). In the above inequalities $\rho_0, \rho_{ii}$, and $\tilde{\rho}_{ii}$ (for i=1,2) are given by $$\frac{1}{2}\log\frac{1}{1-\rho_0^2} \leq (C_1^{out} - C_{20}) + (C_2^{out} - C_{10}) \quad (7)$$

$$\rho_{ii}^2 = 1 - \rho_{i0}^2 - \rho_{id}^2$$

$$\tilde{\rho}_{ii}^2 = 1 - \rho_{i0}^2 - \rho_0^2 \rho_{id}^2.$$

Theorem 4 is proved in Parham Noorzad. Michelle Effros, and Michael Langberg. *On the Cost and Benefit of Cooperation (Extended Version)*, arxiv.org/abs/1504.04432, 17 Apr. 2015, which is hereby incorporated by reference in its entirety.

Figure 8:
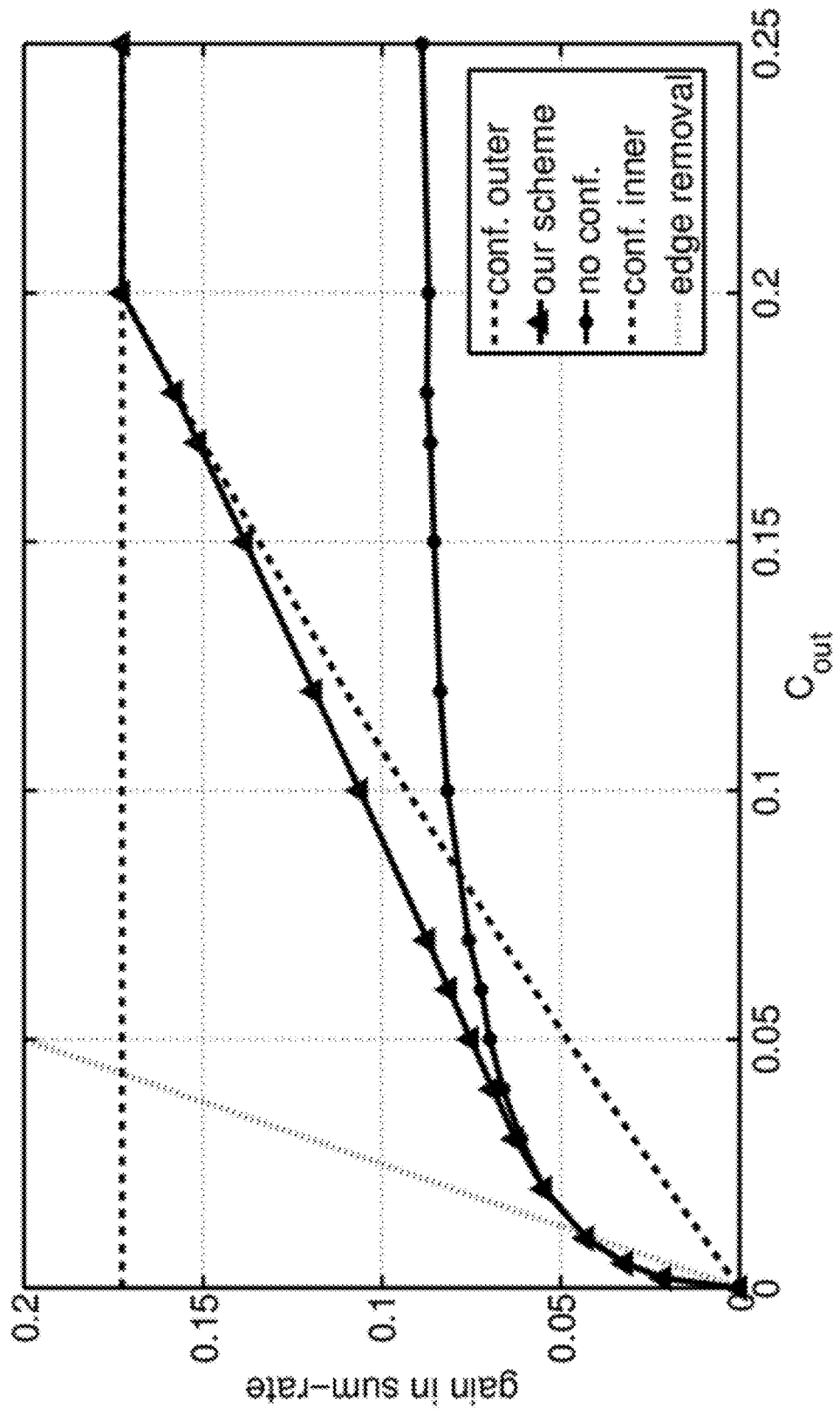
FIG. 8 is a plot illustrating maximum sum-rate gain achieved for a Gaussian multiple access channel in accordance with an embodiment of the invention.

Using Theorem 4, the maximum sum-rate of a scheme in accordance with many embodiments of the invention can be calculated for the Gaussian MAC. The "sum-rate gain" of a cooperation scheme can be defined as the difference between the maximum sum-rate of that scheme and the maximum sum-rate of the classical MAC scheme. FIG. 8 illustrates the plot of the maximum sum-rate gain achieved by the described scheme for the Gaussian MAC with $\gamma_1 = \gamma_2 = 10^3$ and $C_1^{in} = C_2^{in} = 0.2$ as a function of $C_{out}$. FIG. 8 plots the sum-rate gain of a scheme as a function of $C_1^{out} = C_2^{out} =: C_{out}$ for $\gamma_1 = \gamma_2 = 10^3$, $C_1^{in} = C_2^{in} = 0.2$ and $C_{out} \in [0, 0.25]$. The conferencing bounds are also plotted in addition to the no conferencing sum-rate, which is the sum-rate corresponding to a scheme that splits the rate between the coordination and the classical MAC strategies and does not make use of conferencing ($C_{10} = C_{20} = 0$).

Note that for any value of $C_{out}$ for which the gain in sum-rate is greater than $4C_{out}$, adding a $(C_{in}, C_{out})$-CF to the Gaussian MAC results in a network that does not satisfy the edge removal property. The reason is that if the output edges of the $(C_{in}, C_{out})$-CF are removed, the decrease in sum-capacity is greater than $4C_{out}$, which implies the decrease in either $R_1$ or $R_2$ (or both) is greater than $2C_{out}$, which is the total capacity of the removed edges. On the plot, these are the points on our curve which fall above the "edge removal line", that is, the line whose equation is given by gain=$4C_{out}$.

As we see, the scheme that makes no use of conferencing performs well when $C_{out} \ll C_{in}$, and the conferencing scheme works well when $C_{out}$ is close to $C_{in}$ (and is optimal when $C_{out} \geq C_{in}$). Thus both strategies are necessary for our scheme to perform well over the entire range of $C_{out}$. In this case study, the maximum sum-rate of $\mathcal{R}_G$ could have been obtained by a carefully designed time sharing between encoders which only cooperate through conferencing and encoders that use our scheme without conferencing.

2. Unbounded Benefit of Encoder Cooperation for K-User MACs

Cooperation strategies that allow communication devices to work together can improve network capacity. This section generalizes the "cooperation facilitator" (CF) model from the 2-user to the k-user multiple access channel (MAC), extending capacity bounds, characterizing all k-user MACs for which the sum-capacity gain of encoder cooperation exceeds the capacity cost that enables it, and demonstrates an infinite benefit-cost ratio in the limit of small cost.

In the "MAC with CF" model introduced previously, a node called the cooperation facilitator (CF) helps a MAC's encoders to exchange information before they transmit their codewords over the MAC. See FIG. 9 which illustrates a network consisting of a k-user MAC and a CF. The capacity benefit of a CF in a 2-user MAC can far exceed the rate received by each encoder, and the set of all memoryless 2-user MACs for which encoder cooperation with a CF results in a large gain.

In this section, the results obtained with respect to a MAC with CF can be generalized from the 2-user MAC to a k-user MAC. The k-user MAC with a CF provides a general setting for the study of cooperation among multiple encoders and captures previous cooperation models. Descriptions of the model and main results follow.

Figure 9:
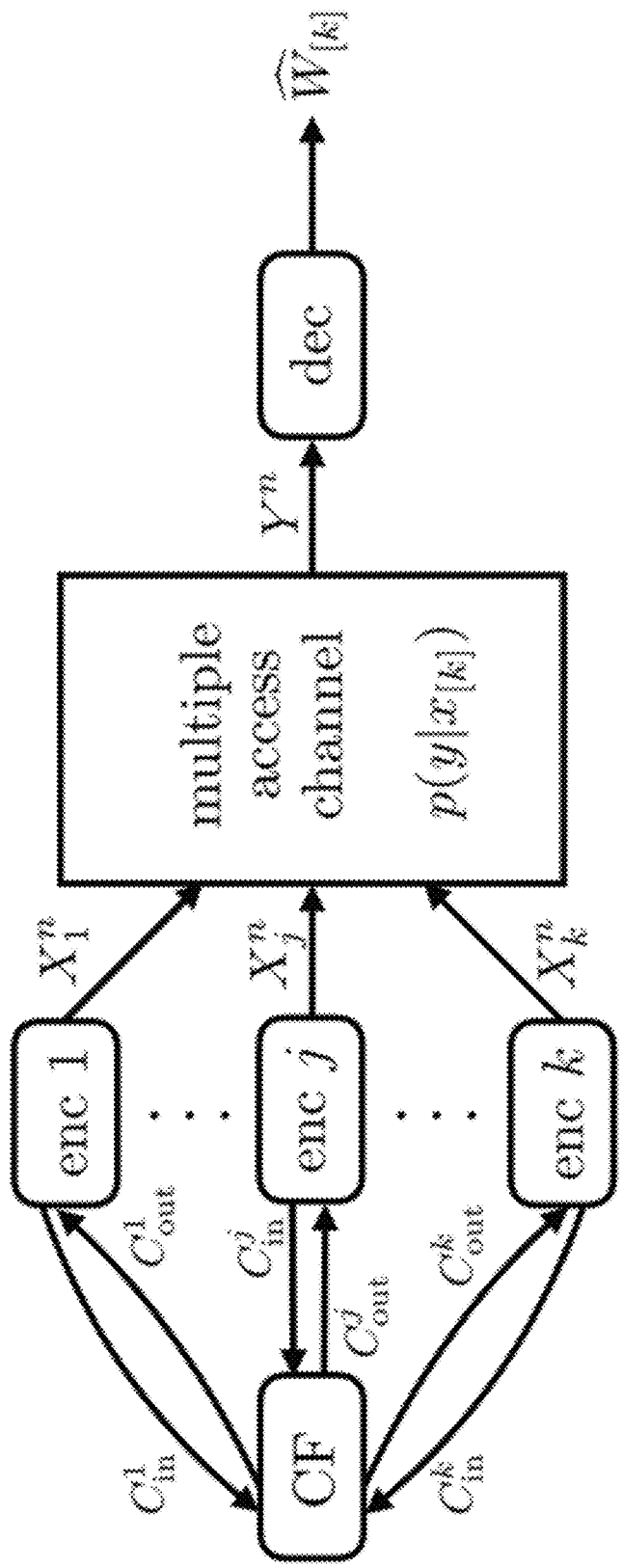
FIG. 9 is a diagram illustrating a k-user multiple access channel utilizing a cooperation facilitator in accordance with an embodiment of the invention.

Fix an integer $k \geq 2$. Consider a network consisting of a k-user MAC and a $(C_{in}, C_{out})$-CF, as shown in FIG. 9. Here, $W_{[k]} = (W_1, \ldots, W_k)$ are the messages from the k encoders, $X_{[k]}^n = (X_1^n, \ldots, X_k^n)$ are the corresponding channel inputs, $\hat{W}_{[k]} = (\hat{W}_1, \ldots, \hat{W}_k)$ are the message reproductions at the decoder, and vectors $C_{in}, C_{out} \in \mathbb{R}_{>0}^k$ describe the capacities of the CF input and output links. The notation $[x]$ describes the set $\{1, \ldots, \lfloor x \rfloor\}$ for any real number $x \geq 1$.

In the first step of cooperation, each encoder sends a rate-limited function of its message to the CF and the CF sends a rate-limited function of what it receives back to each encoder. Communication between the encoders and the CF continues for a finite number of rounds, with each node potentially using information received in prior rounds to determine its next transmission. Once the communication between the CF and the encoders is done, each encoder uses its message and what it has learned through the CF to choose a codeword, which it transmits across the channel.

The main result described further below determines the set of MACs where the benefit of encoder cooperation through a CF can grow very quickly with $C_{out}$. Specifically, it can be shown that for any fixed $C_{in} \in \mathbb{R}_{>0}^k$ and any MAC where the sum-capacity with full cooperation. (Full cooperation means all encoders have access to all k messages.) exceeds the sum-capacity without cooperation, the sum-capacity of that MAC with a $(C_{in}, C_{out})$-CF has an infinite directional derivative at $C_{out} = 0$ in every direction $v \in \mathbb{R}_{>0}^k$. A capacity region outer bound for the MAC can also be derived with a $(C_{in}, C_{out})$-CF. The inner and outer bounds agree when the entries of $C_{out}$ are sufficiently larger than those of $C_{in}$.

The achievability result are proved below using a coding scheme that combines single-step conferencing, coordination, and classical MAC coding. In conferencing, each encoder sends part of its message to all other encoders by passing that information through the CF. (Note it is possible to handle encoders that send different parts of their messages to different encoders.) The coordination strategy in various embodiments of the invention, is a modified version of Marton's coding scheme for the broadcast channel. The CF shares information with the encoders that enables them to transmit codewords that are jointly typical with respect to a dependent distribution; this is proven using a multivariate version of the covering lemma. The MAC strategy is Ulrey's extension of Ahlswede's and Liao's coding strategy to the k-user MAC.

A special case of this model with k=3 can be presented with respect to the Gaussian MAC. In several embodiments of the present invention, it can be shown that a single conferencing step is not optimal in general, even though it is optimal when k=2. Finally, outer bounds can be applied for the k-user MAC with a CF to obtain an outer bound for the k-user MAC with conferencing. The resulting outer bound is tight when k=2. Proof details for results relating to k-user MACs appear in Parham Noorzad. Michelle Effros, and Michael Langberg. *The Unbounded Benefit of Encoder Cooperation for the k-User MAC(Extended Version)*, arxiv.org/abs/1601.06113, 22 Jan. 2016, which is hereby incorporated by reference in its entirety.

2.1 K-User MACs Model and Results

Consider a network with k encoders, a CF, and a decoder as illustrated in FIG. 9. For each $j \in [k]$, encoder j communicates with the CF using lossless links of capacities $C_{in}^j \geq 0$ and $C_{out}^j \geq 0$ going to and from the CF, respectively. The k encoders communicate with the decoder through a memoryless MAC $$\left( \prod_{j=1}^{k} \mathcal{X}_j, p(y|x_1, \ldots, x_k), \mathcal{Y} \right).$$

Each encoder $j \in [k]$ wishes to transmit a message $W_j \in [2^{nR_j}]$ to the decoder. This is accomplished by first exchanging information with the CF and then transmitting across the MAC. Communication with the CF occurs in L steps. For each $j \in [k]$ and $l \in [L]$, sets $(\mathcal{U}_{jl})_{l=1}^L$ and $(\mathcal{V}_{jl})_{l=1}^L$, respectively, describe the alphabets of symbols that encoder j can send to and receive from the CF in step l. These alphabets satisfy the link capacity constraints $\Sigma_{l=1}^L \log |\mathcal{U}_{jl}| \leq nC_{in}^j$ and $\Sigma_{l=1}^L \log |\mathcal{V}_{jl}| \leq nC_{out}^j$. The operation of encoder j and the CF, respectively, at step l are given by $$\varphi_{jl}: [2^{nR_j}] \times \mathcal{V}_j^{l-1} \to \mathcal{U}_{jl}$$

$$\psi_{jl}: \prod_{i=1}^{k} \mathcal{U}_i^l \to \mathcal{V}_{jl}.$$

where $u_j^l = \Pi_{l=1}^l \mathcal{U}_{jl}$ and $\mathcal{V}_j^l = \Pi_{l=1}^l \mathcal{V}_{jl}$. After its exchange with the CF, encoder j applies a function $$f_j: [2^{nR_j}] \times \mathcal{V}_j^L \to \mathcal{X}_j^n,$$

to choose a codeword, which it transmits across the channel. The decoder receives channel output $Y^n$ and applies $$g: \mathcal{Y}^n \to \prod_{j=1}^{k} [2^{nR_j}].$$

to obtain estimate $\hat{W}_{[k]}$ of messages $W_{[k]}$.

The encoders, CF, and decoder together define a $$((2^{nR_1}, \ldots, 2^{nR_k}), n, L)$$

code for the MAC with a $(C_{in}, C_{out})$–CF. The code's average error probability is $P_e^{(n)} = P\{g(Y^n) \neq W_{[k]}\}$, where $W_{[k]}$ is a random vector uniformly distributed on $\Pi_{j=1}^k [2^{nR_j}]$. A rate vector $R_{[k]} = (R_1, \ldots, R_k)$ is achievable if there exists a sequence of $((2^{nR_1}, \ldots, 2^{nR_k}), n, L)$ codes with $P_e^{(n)} \to 0$ as $n \to \infty$. The capacity region, $\mathscr{C}(C_{in}, C_{out})$, is defined as the closure of the set of all achievable rate vectors.

Using the coding scheme to be introduced below, an inner bound can be obtained for the capacity region of the k-user MAC with a $(C_{in}, C_{out})$–CF. The following definitions are useful for describing that bound. For every nonempty $S \subseteq [k]$, define set $X_S = \Pi_{j \in S} X_j$ with elements denoted by $x_S = (x_j)_{j \in S}$. Choose vectors $C_0 = (C_{j0})_{j=1}^k$ and $C_d = (C_{jd})_{j=1}^k$ in $\mathbb{R}_{>0}^k$ such that for all $j \in [k]$, $$C_{j0} \leq C_{in}^j \tag{8}$$

$$C_{jd} + \sum_{i \neq j} C_{i0} \leq C_{out}^j. \tag{9}$$

Here $C_{j0}$ is the number of bits per channel use encoder j sends directly to the other encoders via the CF and $C_{jd}$ is the number of bits per channel use the CF transmits to encoder j to implement the coordination strategy. Subscript "d" in $C_{jd}$ alludes to the dependence created through coordination. Let $S_d = \{j \in [k] : C_{jd} \neq 0\}$ be the set of encoders that participate in this dependence, and define $\mathcal{P}(S_d)$ to be the set of all distributions of the form $$p(u_0) \cdot \prod_{i \in S_d^c} p(u_i | u_0) \cdot p(u_{S_d} | u_0, u_{S_d^c}) \cdot \prod_{j \in [k]} p(x_j | u_0, u_j).$$

that satisfy $\zeta_S > 0$ for all $S \subseteq S_d$, where $$\zeta_S = \sum_{j \in S} C_{jd} - \sum_{j \in S} H(U_j | U_0) + H(U_S | U_0, U_{S_d^c})^*.$$

For any $C_0$ and $C_d$ satisfying Equations (8) and (9) and any $p \in \mathcal{P}(S_d)$, let $\mathscr{R}(C_0, C_d, p)$ be the set of all $R_{[k]}$ that, for every $S, T \subseteq [k]$, satisfy

*The constraint on $\zeta_S$ is imposed by the multivariate covering lemma, which we use in the proof of our inner bound.

$$\sum_{j \in A} (R_j - C_{j0})^+ + \sum_{j \in B \cap T} (R_j - C_{in}^j)^+ < \tag{10}$$

$$I(U_A, X_{A \cup (B \cap T)}; Y | U_0, U_B, X_{B \setminus T}) - \zeta_{(A \cup B) \cap S_d}$$

for some sets A and B for which $S \cap S_d^c \subseteq A \subseteq S$ and $S^c \cap S_d^c \subseteq B \subseteq S^c$, in addition to $$\sum_{j \in [k]} R_j < I(X_{[k]}; Y) - \zeta_{S_d}. \tag{11}$$

Here $U_0$ encodes the "common message," which contains $nC_{j0}$ bits from each $W_j$ and is shared with all other encoders through the CF; each random variable $U_j$ captures the information encoder j receives from the CF to create dependence with the codewords of other encoders.

Next, the inner bound for the k-user MAC can be stated with encoder cooperation via a CF. The coding strategy that achieves this inner bound only uses a single step of cooperation.

Theorem 5 (Inner Bound). For any MAC $(X_{[k]}, p(y|x_{[k]}), Y)$ with a $(C_{in}, C_{out})$-CF, $$\mathscr{C}(C_{in}, C_{out}) \supseteq \cup \overline{\mathscr{R}(C_0, C_d, p)}$$

where $\overline{A}$ denotes the closure of set A and the union is over all $C_0$ and $C_d$ satisfying (8), (9), and $p \in \mathcal{P}(S_d)$.

The region given in Theorem 5 is convex and thus does not require the convex hull operation. We can prove this by applying the same technique used for the 2-user MAC.

In the above theorem, if for every $S,T \subseteq [k]$ with $S \cup T \neq \emptyset$, we choose $A=S$ and $B=S^c$, then our region simplifies to the set of all rate vectors satisfying $$\sum_{j \in S}(R_j - C_{j0})^+ + \sum_{j \in T \setminus S}(R_j - C_{in}^j)^+ < I(X_{S \cup T}; Y | U_0, U_{S^c}, X_{S^c \cap T^c}) - \zeta_{S_d},$$

in addition to Equation (11) for $C_0$ and $C_d$ (satisfying Equations (8) and (9)) and some distribution $p \in \mathcal{P}(S_d)$.

Corollary 1 treats the case where the CF transmits the bits it receives from each encoder to all other encoders without change. We obtain this result from Theorem 5 by setting $C_{jd}=0$ and $X_j=U_j$ for all $j \in [k]$ and choosing $A=S$ and $B=S^c$ for every $S,T \subseteq [k]$.

Corollary 1 (Forwarding Inner Bound). For any MAC $(X_{[k]}, p(y|x_{[k]}), Y)$, $\mathscr{C}(C_{in}, C_{out})$ contains the set of all rate vectors $R_{[k]}$ that for some constants $(C_{j0})_{j \in [k]}$ (satisfying Equations (8) and (9) with $C_{jd}=0$ for all j) and some distribution $p(u_0) \Pi_{j=1}^k p(x_j|u_0)$, satisfy $$\sum_{j \in S} R_j < I(X_S; Y | U_0, X_{S^c}) + \sum_{j \in S} C_{j0},$$

for every nonempty $S \subseteq [k]$, and $$\sum_{j \in [k]} R_j < I(X_{[k]}; Y).$$

As stated above, it is important to determine when the benefit of cooperation is in some sense large. Here we measure the benefit of cooperation by comparing the gain in sum-capacity to the number of bits shared with the encoders to enable that gain.

For any MAC $(X_{[k]}, p(y|x_{[k]}), Y)$ with a $(C^{in}, C^{out})$-CF, define the sum-capacity as $$C_{sum} = \max_{\mathscr{C}(C_{in}, C_{out})} \sum_{j=1}^k R_j.$$

For a fixed $C_{in} \in \mathbb{R}_{\geq 0}^k$, define the "sum-capacity gain" $G: \mathbb{R}_{\geq 0}^k \to \mathbb{R}_{\geq 0}$ as $$G(C_{out}) = C_{sum}(C^{in}, C^{out}) - C_{sum}(C^{in}, 0),$$

where $C_{out}=(C_{out}^j)_{j=1}^k$ and 0 is the all-zeros vector. Note that when $C_{out}=0$, no cooperation is possible, thus $$C_{sum}(C^{in}, 0) = \max_{p(x_1) \ldots p(x_k)} I(X_{[k]}; Y).$$

Using these definitions, the main result of k-user MACs in accordance with several embodiments of the invention is stated below, the proof of which is given in Parham Noorzad. Michelle Effros, and Michael Langberg, *The Unbounded Benefit of Encoder Cooperation for the k-User MAC(Extended Version)*, arxiv.org/abs/1601.06113, 22 Jan. 2016, which is hereby incorporated by reference in its entirety.

Theorem 6 (Sum-Capacity). Consider a discrete MAC $(X_{[k]}, p(y|x_{[k]}), Y)$. Fix $C_{in} \in \mathbb{R}_{\geq 0}^k$. Then the channel satisfies $(D_v G)(0) = \infty$ if and only if $$\max_{p(x_{[k]})} I(X_{[k]}; Y) > \max_{p(x_1) \ldots p(x_k)} I(X_{[k]}; Y),$$

where $v \in \mathbb{R}_{\geq 0}^k$ is any unit vector and $D_v G$ is the directional derivative of G in the direction of v.

While only a single step of cooperation is utilized in our achievability result in (Theorem 5), the outer bound applies to coding schemes that make use of more than one step.

Theorem 7 (Outer Bound). For the MAC $(X_{[k]}, p(y|x_{[k]}), Y)$, $\mathscr{C}(C_{in}, C_{out})$ is a subset of the set of rate vectors $R_{[k]}$ that for some distribution $p(u_0) \Pi_{j=1}^k p(x_j|u_0)$ satisfy $$\sum_{j \in S} R_j \leq I(X_S; Y | U_0, X_{S^c}) + \sum_{j \in S} C_{in}^j \quad (12)$$

for all $\emptyset \neq S \subseteq [k]$, in addition to $$\sum_{j \in [k]} R_j \leq I(X_{[k]}; Y). \quad (13)$$

The proof of this theorem is given in Parham Noorzad. Michelle Effros, and Michael Langberg, *The Unbounded Benefit of Encoder Cooperation for the k-User MAC (Extended Version)*, arxiv.org/abs/1601.06113, 22 Jan. 2016, which is hereby incorporated by reference in its entirety.

If the capacities of the CF output links are sufficiently large, the inner and outer bounds coincide and the capacity region is obtained. This follows by setting $C_{j0}=C_{in}^j$ for all $j \in [k]$ in the forwarding inner bound (Corollary 1) and comparing it with the outer bound given in Theorem 7.

Corollary 2. For the memoryless MAC $(X_{[k]}, p(y|x_{[k]}), Y)$ with a $(C_{in}, C_{out})$-CF, if for every $j \in [k]$, we have $$C_{out}^j \geq \sum_{i: i \neq j} C_{in}^i,$$

then our inner and outer bounds agree.

2.2 K-User MACs Coding Scheme

Choose nonnegative constants $(C_{j0})_{j=1}^k$ and $(C_{jd})_{j=1}^k$ such that for all $j \in [k]$, (8) and (9) hold. Fix a distribution $p \in \mathcal{P}(S_d)$ and choose $\varepsilon, \delta > 0$. Let $R_{j0} = \min\{R_j, C_{j0}\}$ $R_{jd} = \min\{R_j, C_{in}^j\} - R_{j0}$ $R_{jj} = R_j - R_{j0} - R_{jd} = (R_j - C_{in}^j)^+,$ where $x^+=\max\{x,0\}$ for any real number x. For every $j\in[k]$, split the message of encoder j as $w_j=(w_{j0},w_{jd},w_{jj})$ where $w_{j0}\in[2^{nR_{j0}}]$, $w_{jd}\in[2^{nR_{jd}}]$, $w_{jj}\in[2^{nR_{jj}}]$. Encoder j sends $w_{j0}$ to the other encoders via the CF to implement the single-step conferencing strategy. In addition to $w_{j0}$, encoder j sends $w_{jd}$ to the CF to implement the coordination strategy. Note that the sum $R_{j0}+R_{jd}$ is always less than or equal to $C_{in}^j$. Finally, encoder j sends the remaining part of its message, $w_{jj}$, over the channel using the classical MAC strategy.

Let $\mathcal{W}_0=\Pi_{j=1}^k[2^{nR_{j0}}]$. For every $w_0\in\mathcal{W}_0$, let $U_0^n(w_0)$ be distributed as $$P\{U_0^n(w_0)=u_0^n\}=\prod_{t=1}^n p(u_{0t}).$$

Given $U_0^n(w_0)=u_0^n$, for every $j\in[k]$, $w_{jd}\in[2^{nR_{jd}}]$, and $z_j\in[2^{nC_{jd}}]$, let $U_j^n(w_{jd},z_j|u_0^n)$ have distribution $$P\{U_j^n(w_{jd},z_j)\mid u_0^n\}=u_j^n\mid U_0^n(w_0)=u_0^n\}=\prod_{t=1}^n p(u_{jt}\mid u_{0t}). \quad (14)$$

For every $(w_1,\ldots,w_k)$, define $E(u_0^n,\mu_1,\ldots,\mu_k)$ as the event where $U_0^n(w_0)=u_0^n$ and for every $j\in[k]$, $$U_j^n(w_{jd},\cdot|u_0^n)=\mu_j(\cdot), \quad (15)$$

where $\mu_j$ is a mapping from $[2^{nC_{jd}}]$ to $\mathcal{U}_j^n$. Let $\mathcal{A}(u_0^n,\mu_{[k]})$ be the set of all $z_{[k]}$ such that $$(u_0^n,\mu_{[k]}(z_{[k]}))\in A_\delta^{(n)}(U_0,U_{[k]}), \quad (16)$$

where $\mu_{[k]}(z_{[k]})=(\mu_1(z_1),\ldots,\mu_k(z_k))$ and $A_\delta^{(n)}(U_0,U_{[k]})$ is the weakly typical set with respect to the distribution $p(u_0,u_{[k]})$. If $\mathcal{A}(u_0^n,\mu_{[k]})$ is empty, set $Z_j=1$ for all $j\in[k]$. Otherwise, let the k-tuple $Z_{[k]}$ have joint distribution $$P\{\forall j\in[k]:Z_j=z_j\mid E(u_0^n,\mu_{[k]})\}=\frac{1}{|\mathcal{A}(u_0^n,\mu_{[k]})|}.$$

Finally, given $U_0^n(w_0)=u_0^n$ and $U_j^n(w_{jd},Z_j)=u_j^n$, let $X_j^n(w_{jj}|u_0^n,u_j^n)$ be a random vector with distribution $$P\{X_j^n(w_{jj}\mid u_0^n,u_j^n)=x_j^n\mid U_0^n(w_0)=u_0^n,U_j^n(w_{jd},Z_j)=u_j^n\}=$$
$$=p(x_j^n\mid u_0^n,u_j^n)=\prod_{j=1}^n p(x_{jt}\mid u_{0t},u_{jt}).$$

The encoding and decoding processes is described next.

Encoding. For every $j\in[k]$, encoder j sends the pair $(w_{j0},w_{jd})$ to the CF. The CF then sends $((w_{i0})_{i\neq j},Z_j)$ back to encoder j. Encoder j, now having access to $w_0$ and $Z_j$, transmits $X_j^n(w_{jj}|U_0^n(w_0),U_j^n(w_{jd},Z_j))$ over the channel.

Decoding. The decoder, upon receiving $Y^n$, maps $Y^n$ to the unique k-tuple $\hat{w}_{[k]}$ such that $$(U_0^n(\hat{w}_0),(U_j^n(\hat{w}_{jd},\hat{Z}_j|U_0^n))_j,(X_j^n(\hat{w}_{jj}|U_0^n,U_j^n))_j,Y^n)\in A_\epsilon^{(n)}(U_0,U_{[k]},X_{[k]},Y). \quad (17)$$

If such a k-tuple does not exist, the decoder sets its output to the k-tuple $(1,1,\ldots,1)$.

2.3 Case Study: 2-User MAC

As noted above, when k=2, the achievability region in (Theorem 5) contains the region presented above. Here it can be shown that for the network consisting of the 2-user Gaussian MAC with a $((\infty,\infty),(C_{out},C_{out}))$-CF, the region described above strictly contains the region for Gaussian input distributions.

Theorem 5 implies that the capacity region of the mentioned network contains the set of all rate pairs $R_{[2]}$ that satisfy $$R_1\leq\max\{I(X_1;Y|U)-C_{1d},I(X_1;Y|X_2,U)\}+C_{10}$$

$$R_2\leq\max\{I(X_2;Y|U)-C_{2d},I(X_2;Y|X_1,U)\}+C_{20}$$

$$R_1+R_2\leq I(X_1,X_2;Y|U)+C_{10}+C_{20}$$

$$R_1+R_2\leq I(X_1,X_2;Y)$$

for some nonnegative constants $C_{10},C_{20}\leq C_{out}$, $$C_{1d}=C_{out}-C_{20}$$

$$C_{2d}=C_{out}-C_{10},$$

and some distribution $p(u)p(x_1,x_2|u)$ that satisfies $\mathbb{E}[X_i^2]\leq P_i$ for $i\in\{1,2\}$ and $$I(X_1;X_2|U)\leq 2C_{out}-C_{10}-C_{20}.$$

Figure 10:
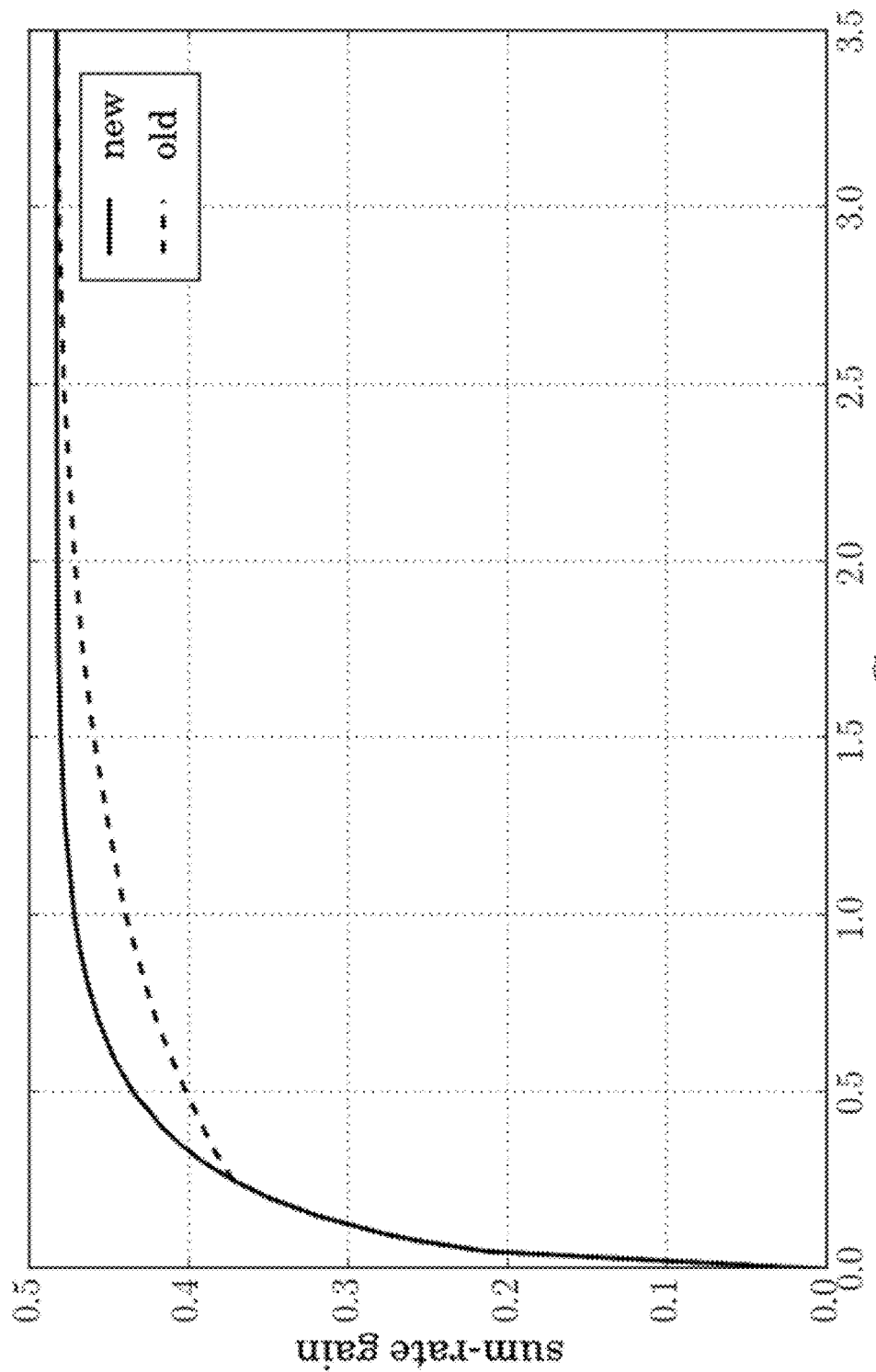
FIG. 10 is a plot illustrating a comparison of the achievable sum-rate for different networks utilizing a cooperation facilitator in accordance with an embodiment of the invention.

When this region is calculated for the Gaussian MAC using a Gaussian input distribution, we get (set $\gamma_i=P_i/N$ for $i\in\{1,2\}$ and $\bar{\gamma}=\sqrt{\gamma_1\gamma_2}$) the set consisting of all rate pairs satisfying $$R_1\leq$$
$$\max\left\{\frac{1}{2}\log\frac{1+(1-\rho_1^2)\gamma_1+(1-\rho_2^2)\gamma_2+2\rho_0\bar{\gamma}\sqrt{(1-\rho_1^2)(1-\rho_2^2)}}{1+(1-\rho_0^2)(1-\rho_2^2)\gamma_2}-C_{1d},\right.$$
$$\left.\frac{1}{2}\log(1+(1-\rho_0^2)(1-\rho_1^2)\gamma_1)\right\}+C_{10}$$

$$R_2\leq\max\left\{\frac{1}{2}\log\frac{1+(1-\rho_1^2)\gamma_1+(1-\rho_2^2)\gamma_2+2\rho_0\bar{\gamma}\sqrt{(1-\rho_1^2)(1-\rho_2^2)}}{1+(1-\rho_0^2)(1-\rho_1^2)\gamma_1}-\right.$$
$$\left.C_{2d},\frac{1}{2}\log(1+(1-\rho_0^2)(1-\rho_2^2)\gamma_2)\right\}+C_{20}$$

and $$R_1+R_2\leq$$
$$\frac{1}{2}\log\left(1+(1-\rho_1^2)\gamma_1+(1-\rho_2^2)\gamma_2+2\rho_0\bar{\gamma}\sqrt{(1-\rho_1^2)(1-\rho_2^2)}\right)$$

$$R_1+R_2\leq\frac{1}{2}\log(1+\gamma_1+\gamma_2+2\rho_0\bar{\gamma})$$

for some $\rho_1,\rho_2\in[0,1]$ and $0\leq\rho_0\leq\sqrt{1-2^{-2(C_{1d}+C_{2d})}}$. FIG. 10 illustrates a comparison of the achievable sum-rate gain for the Gaussian MAC with Gaussian input distribution using results described above with respect to the Gaussian MAC (old) and results described in this section (new). The difference is clear from the plot.

2.4 The k-User Mac with Conferencing Encoders

Figure 11:
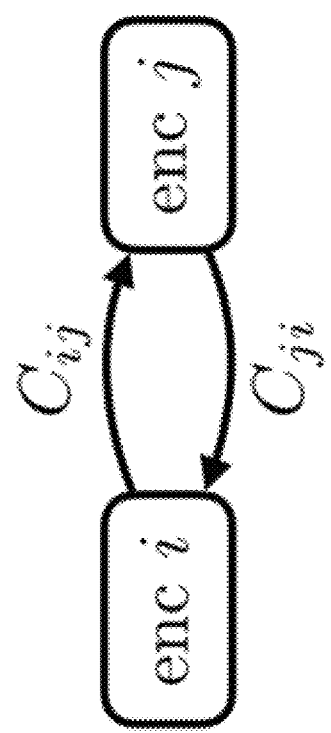
FIG. 11 is a diagram illustrating a k-user multiple access channel with conferencing in accordance with an embodiment of the invention.

Willems' conferencing model can be extended to the k-user MAC as follows. Consider a k-user MAC where for every $i,j\in[k]$ (in this section, $i\neq j$ by assumption), there is a link of capacity $C_{ij}\geq 0$ from encoder i to encoder j and a link of capacity $C_{ji}\geq 0$ back. See FIG. 11 which illustrates in the k-user MAC with conferencing, for every $i,j\in[k]$, there are links of capacities $C_{ij}$ and $C_{ji}$ connecting encoder i and encoder j.

As in 2-user conferencing, conferencing occurs over a finite number of steps. In the first step, for every $j \in [k]$, encoder j transmits some information to encoder i (for every i with $C_{ji} > 0$) that is a function of its own message $W_j \in [2^{nR_j}]$. In each subsequent step, every encoder transmits information that is a function of its message and information it learns before that step. Once the conferencing is over, each encoder transmits its codeword over the k-user MAC. Next define a $((2^{nR_1}, \ldots, 2^{nR_k}), n, L)$-code for the k-user MAC with an L-step $(C_{ij})_{i,j=1}^k$-conference. For every $i,j \in [k]$ and $l \in [L]$, fix a set $\mathcal{V}_{ij}^{(l)}$ so that for every $i,j \in [k], \Sigma_{l=1}^L \log |\mathcal{V}_{ij}^{(l)}| \leq nC_{ij}$. Here $\mathcal{V}_{ij}^{(l)}$ represents the alphabet of the symbol encoder i sends to encoder j in step l of the conference. For every $l \in [L]$, define $\mathcal{V}_{ij}^{(l)} = \Pi_{l'=1}^l \mathcal{V}_{ij}^{(l')}$. For $j \in [k]$ encoder j is represented by the collection of functions $(f_j, (h_{ji}^{(l)})_{i,l})$ where $$f_j: [2^{nR_j}] \times \prod_{i:i \neq j} \mathcal{V}_{ij}^L \to \mathcal{X}^n$$

$$h_{ji}^{(l)}: [2^{nR_j}] \times \prod_{i':i' \neq j} \mathcal{V}_{i'j}^{l-1} \to \mathcal{V}_{ji}^{(l)}$$

The decoder is defined as $g:y^n \to \Pi_{j=1}^k [2^{nR_j}]$. The definition of an achievable rate vector and the capacity region are similar to those described above.

The next result compares the capacity region of a MAC with cooperation under the conferencing and CF models. The proof is given in Parham Noorzad. Michelle Effros, and Michael Langberg, *The Unbounded Benefit of Encoder Cooperation for the k-User MAC (Extended Version)*, arxiv.org/abs/1601.06113, 22 Jan. 2016, which is hereby incorporated by reference in its entirety.

Theorem 8. The capacity region of a MAC with an L-step $(C_{ij})_{i,j=1}^k$-conference is a subset of the capacity region of the same MAC with an L-step cooperation via a $(C_{in}, C_{out})$–CF if for all $j \in [k]$, $$C_{in}^j \geq \sum_{i:i \neq j} C_{ji} \text{ and } C_{out}^j \geq \sum_{i:i \neq j} C_{ij}.$$

Similarly) for every L, the capacity region of a MAC with L-step cooperation via a $(C_{in}, C_{out})$–CF is a subset of the capacity region of the same MAC with a single-step $(C_{ij})_{i,j=1}^k$-conference if for all $i,j \in [k], C_{ij} \geq C_{in}^i$.

Combining the first part of Theorem 8 with the outer bound from Theorem 7 results in the next corollary.

Corollary 3 (Conferencing Outer Bound). For the memoryless MAC $(X_{[k]}, p(y|x_{[k]}), y)$ with a $(C_{ij})_{i,j=1}^k$-conference, the set of achievable rate vectors is a subset of the set of rate vectors $R_{[k]}$ that for some distribution $p(u)\Pi_{j=1}^k p(x_j|u)$ satisfy $$\sum_{j \in S} R_j \leq I(X_S; Y | U, X_{S^c}) + \sum_{j \in S} \sum_{i \neq j} C_{ji}$$

for every nonempty $S \subseteq [k]$, in addition to $$\sum_{j \in [k]} R_j \leq I(X_{[k]}; Y).$$

While k-user conferencing is a direct extension of 2-user conferencing, there is nonetheless a major difference when $k \geq 3$. While it is well known that in the 2-user case a single conferencing step suffices to achieve the capacity region, the same is not true when $k \geq 3$, as is illustrated next.

Figure 12B:
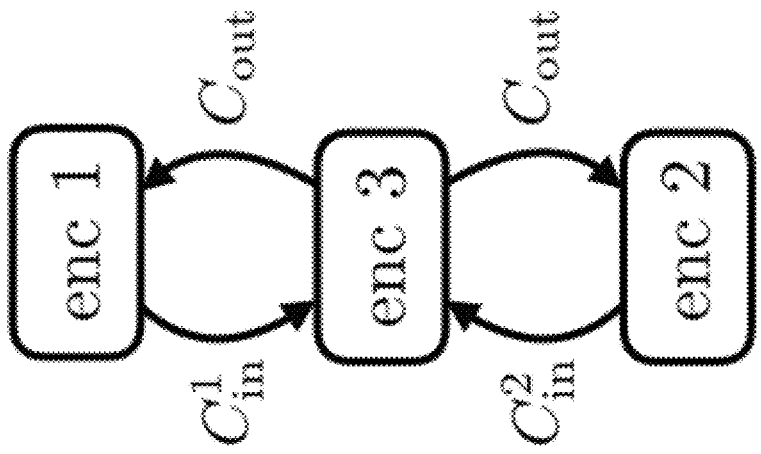
FIG. 12B is a diagram illustrating an alternative conferencing structure for a multiple access channel in accordance with an embodiment of the invention.
Figure 12A:
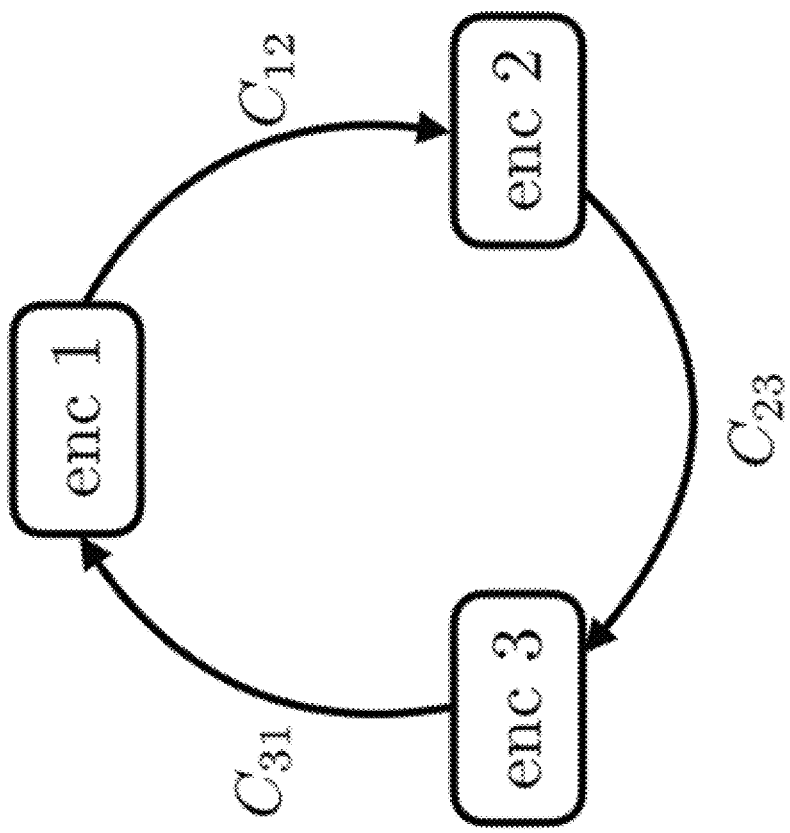
FIG. 12A is a diagram illustrating a conferencing structure for a 3-user Gaussian multiple access channel in accordance with an embodiment of the invention.

A special case of this model for the 3-user Gaussian MAC is shown in FIG. 12A, which illustrates a conferencing structure. FIG. 12B illustrates an alternative conferencing structure where increasing the number of steps results in a larger capacity region. Consider the network consisting of a 3-user MAC with conferencing. Fix positive constants $C_{in}^1$ and $C_{in}^2$. Let $C_{13} = C_{in}^1, C_{23} = C_{in}^2$, $C_{31} = C_{32} = C_{out}$ for $C_{out} \in \mathbb{R}_{\geq 0}$, and $C_{12} = C_{21} = 0$.

Let $\mathcal{C}_1(C_{out})$ and $\mathcal{C}_2(C_{out})$ denote the capacity region of this network with one and two steps of conferencing, respectively. For each $L \in \{1,2\}$, define the function $g_L(C_{out})$ as $$g_L(C_{out}) = \max_{(R_1,R_2,0) \in \mathcal{C}_L(C_{out})} (R_1 + R_2).$$

Note that when $L=1$, $g_1(C_{out}) = g_1(0)$ for all $C_{out}$ since no cooperation is possible when encoder 3 is transmitting at rate zero. On the other hand, as shown next, at least for some MACs (including the Gaussian MAC), $g'_2(0) = \infty$, that is, $g_2$ has an infinite slope at $C_{out} = 0$. Note that $$g_2(0) = g_1(0) = \max_{p(x_1)p(x_2), x_3} I(X_1, X_2; Y | X_3 = x_3).$$

Let $p^*(x_1)p^*(x_2)$ and $x^*_3$ achieve this maximum. If a MAC satisfies the condition $$\max_{p(x_1,x_2)} I(X_1, X_2; Y | X_3 = x^*_3) > g_2(0),$$

then by Theorem 6 (for k=2), $g'_2(0) = \infty$. Since $g_1$ is constant for all $C_{out}$, while $g_2$ has an infinite slope at $C_{out} = 0$, and $g_1(0) = g_2(0)$, the 2-step conferencing region is strictly larger than the single-step conferencing region. Using the same technique, a similar result for any $k \geq 3$ can be shown; that is, there exist k-user MACs where the two-step conferencing region strictly contains the single-step region.

3. Cooperation Increasing Network Reliability

In network cooperation strategies, nodes work together with the aim of increasing transmission rates or reliability. This section demonstrates that enabling cooperation between the transmitters of a two-user multiple access channel via a cooperation facilitator that has access to both messages, always results in a network whose maximal- and average-error sum-capacities are the same—even when the information shared with the encoders is negligible. Thus, for a multiple access channel whose maximal- and average-error sum-capacities differ, the maximal-error sumcapacity is not continuous with respect to the output edge capacities of the facilitator. This shows that for some networks, sharing even a negligible number of bits per channel use with the encoders can yield a non-negligible benefit.

Cooperative strategies enable an array of code performance improvements, including higher transmission rates and higher reliability. In this work, the same benefit can be viewed as either an improvement in rate for a given reliability or an improvement in reliability for a given rate. A discussion of the latter perspective is included first.

Consider a network with multiple transmitters and a single receiver. Given a code, one can calculate the probability of error at the receiver for each possible message vector. The probability of error, viewed as a function of the transmitted message vector, provides a measure of the reliability of the code. The average- and maximal-error probabilities of the code are the average and maximum of the range of this function, respectively. To understand the relationship between cooperation and reliability, study how cooperation can be used to increase the reliability of a code. Specifically, seek to modify a code that achieves small average error without cooperation to obtain a code at the same rate that achieves small maximal error using rate-limited cooperation.

Figure 13:
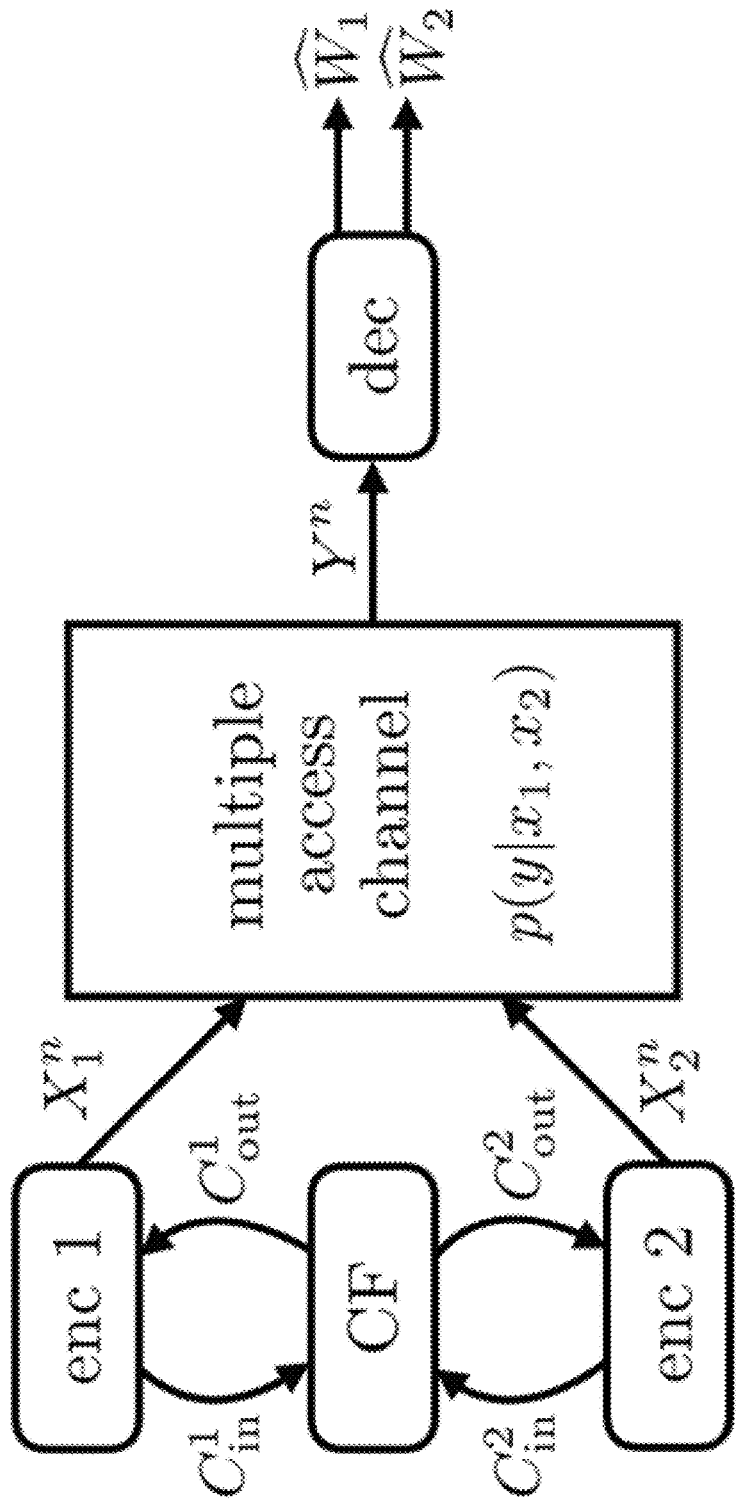
FIG. 13 is a diagram illustrating a memoryless multiple access channel and a cooperation facilitator in accordance with an embodiment of the invention.

To make this discussion more concrete, consider a network consisting of a multiple access channel (MAC) and a cooperation facilitator (CF), as shown in FIG. 13. FIG. 13 illustrates a network consisting of a memoryless MAC and a CF. The CF is a node that can send and receive limited information to and from each encoder. Each encoder, prior to transmitting its codeword over the channel, sends some information to the CF. The CF then replies to each encoder over its output links. This communication may continue for a finite number of steps. The total number of bits transmitted on each CF link is bounded by the product of the blocklength, n, and the capacity of that link. Once the encoders' communication with the CF is over, each encoder transmits its codeword over n uses of the channel.

In order to quantify the benefit of rate-limited cooperation in the above network, a spectrum of error probabilities is defined that range from average error to maximal error. The main result, described below, states that if for $i \in \{1,2\} C_{in}^i$ is increased (the capacity of the link from encoder i to the CF) by some constant value and $C_{out}^i$ (the capacity of the link from the CF to encoder i) by any arbitrarily small amount, then any rate pair that is achievable in the original network under average error is achievable in the new network under a stricter notion of error. This result, stated formally below, quantifies the relationship between cooperation and reliability. The proof, as illustrated in Parham Noorzad, Michelle Effros, and Michael Langberg. *Can Negligible Cooperation Increase Network Reliability?* (*Extended Version*), arxiv.org/abs/1601.05769, 21 Jan. 2016, which is hereby incorporated by reference in its entirety, shows that the average- and maximal-error capacity regions of the discrete memoryless broadcast channel are identical.

A specific instance of an embodiment of the present invention is the case where $C_{in}^1$ and $C_{in}^2$ are sufficiently large so that the CF has access to both source messages. In this case, it can be shown that whenever $C_{out}^1$ and $C_{out}^2$ are strictly positive, the maximal-error capacity region of the resulting network is identical to its average-error capacity region. Applying this result to Dueck's "Contraction MAC." which has a maximal-error capacity region strictly smaller than its average-error capacity region, yields a network whose maximal-error sum-capacity is not continuous with respect to the capacities of its edges. The discontinuity in sum-capacity observed here is related to the edge removal problem, which is discussed next.

The edge removal problem studies the change in network capacity that results from removing an edge of finite capacity. One instance of this problem considers removed edges of "negligible capacity." Intuitively, an edge can be thought of as having negligible capacity if the number of bits that it can carry in n channel uses grows sublinearly in n; for example, an edge that can carry log n bits in n channel uses has negligible capacity. In this context, the edge removal problem asks whether removing an edge with negligible capacity from a network has any effect on the capacity region of that network. This result showing the existence of a network with a discontinuous maximal-error sum-capacity demonstrates the existence of a network where removing an edge with negligible capacity has a non-negligible effect on its maximal-error capacity region.

Given that one may view feedback as a form of cooperation, similar questions may be posed about feedback and reliability. It can be shown that for some MACs, the maximal-error capacity region with feedback is strictly contained in the average-error region without feedback. This is in contrast to various embodiments of the present invention of encoder cooperation via a CF that has access to both messages and output edges of negligible capacity. It is shown below that for any MAC with this type of encoder cooperation, the maximal-error and average-error regions are identical. Hence, unlike cooperation via feedback, the maximal-error region of a MAC with negligible encoder cooperation contains the average-error region of the same MAC without encoder cooperation.

In the next section, the model for increasing network reliability is introduced. This is followed by a discussion of results. The proofs of all theorems are available in Parham Noorzad. Michelle Effros, and Michael Langberg, *Can Negligible Cooperation Increase Network Reliability?* (*Extended Version*), arxiv.org/abs/1601.05769, 21 Jan. 2016, which is hereby incorporated by reference in its entirety.

3.1 Reliability Models

Consider a network comprising two encoders, a $(C_{in}, C_{out})$–CF, a memoryless MAC $$(X_1 \times X_2, p(y|x_1,x_2), Y),$$

and a decoder. Define an $(n, M_1, M_2, J)$-code for this network with transmitter cooperation. For every real number $x \geq 1$, let [x] denote the set $\{1, \ldots, \lfloor x \rfloor\}$, where $\lfloor x \rfloor$ denotes the integer part of x. For each $i \in \{1,2\}$ fix two sequences of sets $(\mathcal{U}_{ij})_{j=1}^J$ and $(\mathcal{V}_{ij})_{j=1}^J$ such that $$\log|\mathcal{U}_i^J| = \sum_{j=1}^J \log|\mathcal{U}_{ij}| \leq nC_{in}^i$$

$$\log|\mathcal{V}_i^J| = \sum_{j=1}^J \log|\mathcal{V}_{ij}| \leq nC_{out}^i,$$

where for all $j \in [J]$, $$\mathcal{U}_i^j = \prod_{\ell=1}^j \mathcal{U}_{i\ell}$$

$$\mathcal{V}_i^j = \prod_{\ell=1}^j \mathcal{V}_{i\ell},$$

and log denotes the natural logarithm. Here $\mathcal{U}_{ij}$ represents the alphabet for the $j^{th}$-step transmission $\mathcal{U}_{ij}$ from encoder i to the CF while $\mathcal{V}_{ij}$ represents the alphabet for the $j^{th}$-step transmission from the CF to encoder i. The given alphabet size constraints are chosen to match the total rate constraints $nC_{in}^i$ and $nC_{out}^i$ over J steps of communication between the two encoders and n uses of the channel. For $i \in \{1,2\}$, encoder i is represented by $((\varphi_{ij})_{j=1}^J, f_i)$, where $$\varphi_{ij}: [M_i] \times \mathcal{V}_i^{j-1} \to \mathcal{U}_{ij}$$

captures the step-j transmission from encoder i to the CF, and $$f_i: [M_i] \times \mathcal{V}_i^J \to X_i^n.$$

captures encoder i's transmission across the channel. The CF is represented by the functions $((\psi_{1j})_{j=1}^J,(\psi_{2j})_{j=1}^J)$, where for $i \in \{1,2\}$ and $j \in [J]$, $$\psi_{ij}: \mathcal{U}_1^j \times \mathcal{U}_2^j \to \mathcal{V}_{ij}$$

captures the step-j transmission from the CF to encoder i. For each message pair $(m_1,m_2)$, $i \in \{1,2\}$, and $j \in [J]$, define $$u_{ij} = \varphi_{ij}(m_i, v_i^{j-1})$$

$$v_{ij} = \psi_{ij}(u_1^i, u_2^j).$$

At step j, encoder i sends $u_{ij}$ to the CF and receives $v_{ij}$ from the CF. After the J-step communication between the encoders and the CF is over, encoder i transmits $f_i(m_i, v_i^J)$ over the channel. The decoder is represented by the function $$g: y^n \to [M_1] \times [M_2].$$

The probability that a message pair $(m_1,m_2)$ is decoded incorrectly is given by $$\lambda_n(m_1, m_2) = \sum_{y^n \notin g^{-1}(m_1,m_2)} p(y^n \mid f_1(m_1, v_1^J), f_2(m_2, v_2^J)).$$

The average probability of error, $P_{e,avg}^{(n)}$, and the maximal probability of error, $P_{e,max}^{(n)}$, are defined as $$P_{e,avg}^{(n)} = \frac{1}{M_1 M_2} \sum_{m_1,m_2} \lambda_n(m_1, m_2)$$

$$P_{e,max}^{(n)} = \max_{m_1,m_2} \lambda_n(m_1, m_2),$$

respectively. To quantify the benefit of cooperation in the case where the CF input links are rate-limited, a more general notion of probability of error is required, which is described next.

For $i \in \{1,2\}$, fix $r_i \geq 0$, and set $$K_i = \min\{\lfloor e^{nr_i} \rfloor, M_i\}$$

$$L_i = \lfloor M_i/K_i \rfloor.$$

Furthermore, for $i \in \{1,2\}$ and $k_i \in [K_i]$, define the set $S_{i,k_i} \subseteq [M_i]$ of size $L_i$ as $$S_{i,k_i} = \{(k_i-1)L_i+1, \ldots, k_i L_i\}. \quad (18)$$

To simplify notation, denote $S_{i,k_i}$ with $S_{k_i}$. Now define $$P_e^{(n)}(r_1, r_2) = \min_{\sigma_1, \sigma_2} \max_{k_1, k_2} \frac{1}{L_1 L_2} \sum_{\substack{m_1 \in S_{k_1} \\ m_2 \in S_{k_2}}} \lambda_n(\sigma_1(m_1), \sigma_2(m_2)),$$

where the minimum is over all permutations $\sigma_1$ and $\sigma_2$ of the sets $[M_1]$ and $[M_2]$, respectively. To compute $P_e^{(n)}(r_1,r_2)$, partition the matrix $$\Lambda_n := (\lambda_n(m_1,m_2))_{m_1 m_2} \quad (19)$$

into $K_1 K_2$ blocks of size $L_1 \times L_2$. Then calculate the average of the entries within each block. The $(r_1, r_2)$-probability of error, $P_e^{(n)}(r_1,r_2)$, is the maximum of the $K_1 K_2$ obtained average values. The minimization over all permutations of the rows and columns of $\Lambda_n$ ensures $P_e^{(n)}(r_1,r_2)$ is invariant with respect to relabeling the messages. Note that $P_{e,avg}^{(n)}$ and $P_{e,max}^{(n)}$ are special cases of $P_e^{(n)}(r_1,r_2)$, since $$P_e^{(n)}(0,0) = P_{e,avg}^{(n)}$$

and for sufficiently large values of $r_1$ and $r_2$, $$P_e^{(n)}(r_1,r_2) = P_{e,max}^{(n)}.$$

A rate pair $(R_1,R_2)$ is achievable under the $(r_1,r_2)$ notion of error for a MAC with a $(C_{in},C_{out})$-CF and J steps of cooperation if for all $\varepsilon, \delta > 0$, and for n sufficiently large, there exists an $(n,M_1,M_2,J)$-code such that for $i \in \{1,2\}$.

$$\frac{1}{n} \log(K_i L_i) \geq R_i - \delta, \quad (20)$$

and $P_e^{(n)}(r_1,r_2) \leq \varepsilon$. In Equation (20), use $K_i L_i$ instead of $M_i$ since only $K_i L_i$ elements of $[M_i]$ are used in calculating $P_e^{(n)}(r_1,r_2)$. Define the $(r_1,r_2)$-capacity region as the closure of the set of all rates that are achievable under the $(r_1,r_2)$ notion of error.

3.2 Cooperation and Reliability

Define the nonnegative numbers $R^*_1$ and $R^*_2$ as the maximum of $R_1$ and $R_2$ over the average-error capacity region of a MAC with a $(C_{in},C_{out})$-CF and J cooperation steps. From the capacity region of the MAC with conferencing encoders, it follows $$R^*_1 = \max_{X_1-U-X_2} \min\{I(X_1;Y|U,X_2) + C_{12}, I(X_1,X_2;Y)\}$$

$$R^*_2 = \max_{X_1-U-X_2} \min\{I(X_2;Y|U,X_1) + C_{21}, I(X_1,X_2;Y)\},$$

where $C_{12} = \min\{C_{in}^1, C_{out}^2\}$ and $C_{21} = \min\{C_{in}^2, C_{out}^1\}$. This follows from the fact that when one encoder transmits at rate zero, cooperation through a CF is no more powerful then direct conferencing. Note that $R^*_1$ and $R^*_2$ do not depend on J, since using multiple conferencing steps does not enlarge the average-error capacity region for the 2-user MAC.

The main result of this section is stated next, which says that if a rate pair is achievable for a MAC with a CF under average error, then sufficiently increasing the capacities of the CF links ensures that the same rate pair is also achievable under a stricter notion of error. This result applies to any memoryless MAC whose average-error capacity region is bounded.

Theorem 9. The $(\tilde{r}_1,\tilde{r}_2)$-capacity region of a MAC with a $(\tilde{C}_{in},\tilde{C}_{out})$-CF and $\tilde{J}$ steps of cooperation contains the average-error capacity region of the same MAC with a $(C_{in},C_{out})$-CF and J steps of cooperation if $\tilde{J} \geq J+1$ and for $i \in \{1,2\}$, $$\tilde{C}_{in}^i > \min\{C_{in}^i + \tilde{r}_i, R^*_i\}$$

$$\tilde{C}_{out}^i > C_{out}^i.$$

Furthermore, if for $i \in \{1,2\}, \tilde{C}_{in}^i > R^*_i$, it suffices to take $\tilde{J} = 1$. Similarly, $\tilde{J} = 1$ is sufficient when $C_{in} = 0$.

A detailed proof can be found in Parham Noorzad, Michelle Effros, and Michael Langberg, *Can Negligible Cooperation Increase Network Reliability?* (*Extended Version*), arxiv.org/abs/1601.05769, 21 Jan. 2016, which is hereby incorporated by reference in its entirety.

3.3 The Average- and Maximal-Error Capacity Regions

For every $(C_{in},C_{out}) \in \mathbb{R}^2_{\geq 0}$, let $\mathscr{C}_{avg}^J(C_{in},C_{out})$ denote the average-error capacity region of a MAC with a $(C_{in},C_{out})$-CF with J cooperation steps. Let $\mathscr{C}_{avg}(C_{in},C_{out})$ denote the convex closure of $$\bigcup_{J=1}^{\infty} \mathscr{C}_{avg}^J(C_{in}, C_{out}).$$

Define $\mathscr{C}_{max}^J$ and $\mathscr{C}_{max}$ similarly.

Next, a generalization of the notion of sum-capacity is introduced which is useful for the results of this section. Let $\mathscr{C}$ be a compact subset of $\mathbb{R}^2_{\geq 0}$. For every $\alpha \in [0,1]$ define $$C^{\alpha}(\mathscr{C}) = \max_{(x,y)\in\mathscr{C}} (\alpha x + (1-\alpha)y). \quad (21)$$

Note that $C^{\alpha}$ is the value of the support function of $\mathscr{C}$ computed with respect to the vector $(\alpha, 1-\alpha)$. When $\mathscr{C}$ is the capacity region of a network, $C^{1/2}(\mathscr{C})$ equals half the corresponding sum-capacity.

For every $C_{out} \in \mathbb{R}^2_{\geq 0}$, let $$\mathscr{C}_{avg}(C_{out}) = \mathscr{C}_{avg}((\infty,\infty), C_{out}).$$

and for $\alpha \in [0,1]$, define $$C_{avg}^{\alpha}(C_{out}) = C^{\alpha}(\mathscr{C}_{avg\ avg}(C_{out})).$$

In words, $\mathscr{C}_{avg}(C_{out})$ denotes the average-error capacity region of a MAC with a CF that has access to both messages and output edge capacities given by $C_{out}=(C_{out}^1, C_{out}^2)$. Define $\mathscr{C}_{max}(C_{out})$ and $C_{max}^{\alpha}(C_{out})$ similarly. Note that in the definitions of both $\mathscr{C}_{avg}(C_{out})$ and $\mathscr{C}_{max}(C_{out})$, $C_{in}=(\infty,\infty)$ can be replaced with any $C_{in}=(C_{in}^1, C_{in}^2)$ where $$\min\{C_{in}^1, C_{in}^2\} > \max_{p(x_1, x_2)} I(X_1, X_2; Y).$$

The "avg" and "max" subscripts are dropped when a statement is true for both the maximal- and average-error capacity regions.

The main theorem of this section follows. This theorem states that cooperation through a CF that has access to both messages results in a network whose maximal- and average-error capacity regions are identical.

Theorem 10. For every $C_{out} \in \mathbb{R}^2_{\geq 0}$, $$\mathscr{C}_{max}(C_{out}) = \mathscr{C}_{avg}(C_{out}).$$

Furthermore, for Dueck's contraction MAC, there exists $C_{in} \in \mathbb{R}^2_{\geq 0}$ such that for every $C_{out} \in \mathbb{R}^2_{>0}$, $\mathscr{C}_{max}(C_{in}, C_{out})$ is a proper subset of $\mathscr{C}_{avg}(C_{in}, C_{out})$.

Next, the capacity region of a network containing edges of negligible capacity is formally defined. Let $\mathcal{N}$ be a network containing a single edge of negligible capacity. For every $\delta > 0$, let $\mathcal{N}(\delta)$ be the same network with the difference that the edge with negligible capacity is replaced with an edge of capacity $\delta$. A rate vector is achievable over $\mathcal{N}$ if and only if for every $\delta > 0$, that rate vector is achievable over $\mathcal{N}(\delta)$. Achievability over networks with multiple edges of negligible capacity is defined inductively.

From the above definition, it now follows that the capacity region of a MAC with a CF that has complete access to both messages and output edges of negligible capacity, equals $$\bigcap_{C_{out} \in \mathbb{R}^2_{>0}} \mathscr{C}(C_{out}).$$

From Theorem 10 it follows that for every MAC.

$$\bigcap_{C_{out} \in \mathbb{R}^2_{>0}} \mathscr{C}_{max}(C_{out}) = \bigcap_{C_{out} \in \mathbb{R}^2_{>0}} \mathscr{C}_{avg}(C_{out}) \supseteq \mathscr{C}_{avg}(0). \quad (22)$$

where $0=(0,0)$. Thus if for a MAC we have $$C_{avg}^{\alpha}(0) > C_{max}^{\alpha}(0) \quad (23)$$

for some $\alpha \in (0,1)$, then $C_{max}^{\alpha}(C_{out})$ is not continuous at $C_{out}=0$, since by Equation (22), $$\lim_{C_{out}\to 0^+} C_{max}^{\alpha}((C_{out}, C_{out})) = \lim_{C_{out}\to 0^+} C_{avg}^{\alpha}((C_{out}, C_{out})) \geq C_{avg}^{\alpha}(0) > C_{max}^{\alpha}(0).$$

It can be shown that Dueck's contraction MAC satisfies Equation (23) for every $\alpha \in (0,1)$. Thus there exists a MAC where $C_{max}^{\alpha}(C_{out})$ is not continuous at $C_{out}=0$ for any $\alpha \in (0,1)$. This example demonstrates that the introduction of a negligible capacity edge can have a strictly positive impact on the network capacity.

For the average-error capacity region of the MAC, less is known. For some MACs, the directional derivative of $C_{avg}^{1/2}(C_{out})$ at $C_{out}=0$ equals infinity for all unit vectors in $\mathbb{R}^2_{>0}$. The question of whether $C_{avg}^{1/2}(C_{out})$ is continuous on $\mathbb{R}^2_{>0}$ for such MACs remains open.

Next, an overview of the proof of the first part of Theorem 10 is provided. First, using Theorem 9, we show that for every $C_{out}=(C_{out}^1, C_{out}^2)$ and $\tilde{C}_{out}=(\tilde{C}_{out}^1, \tilde{C}_{out}^2)$ in $\mathbb{R}^2_{>0}$ for which $\tilde{C}_{out}^1 > C_{out}^1$ and $\tilde{C}_{out}^2 > C_{out}^2$, we have $$\mathscr{C}_{max}(\tilde{C}_{out}) \supseteq \mathscr{C}_{avg}(C_{out}).$$

Note that $\mathscr{C}_{avg}(C_{out})$ contains $\mathscr{C}_{max}(C_{out})$. Thus a continuity argument may be helpful in proving equality between the average- and maximal-error capacity regions. Since studying $C^{\alpha}$ is simpler than studying the capacity region directly, we formulate our problem in terms of $C^{\alpha}$. For every $\alpha \in [0,1]$, we have $$C_{max}^{\alpha}(C_{out}) \leq C_{avg}^{\alpha}(C_{out}) \leq C_{max}^{\alpha}(\tilde{C}_{out}). \quad (24)$$

The next theorem investigates the continuity of the $C^{\alpha}$'s.

Theorem 11. For every $\alpha \in [0,1]$, the mappings $C_{max}^{\alpha}(C_{out})$ and $C_{avg}^{\alpha}(C_{out})$ are concave on $\mathbb{R}^2_{>0}$ and thus continuous on $\mathbb{R}^2_{>0}$.

By combining the above theorem with Equation (24), it follows that for every $\alpha \in [0,1]$ and $C_{out} \in \mathbb{R}^2_{>0}$.

$$C_{max}^{\alpha}(C_{out}) = C_{avg}^{\alpha}(C_{out}).$$

Since for a given capacity region $\mathscr{C}$, the mapping $\alpha \mapsto C_{\alpha}(\mathscr{C})$ characterizes $\mathscr{C}$ precisely (see next theorem), for every $C_{out} \in \mathbb{R}^2_{>0}$, $$\mathscr{C}_{max}(C_{out}) = \mathscr{C}_{avg}(C_{out}).$$

Theorem 12. Let $\mathscr{C} \supseteq \mathbb{R}^2_{\geq 0}$ be non-empty, compact, convex, and closed under projections onto the axes, that is, if $(x,y)$ is in $\mathscr{C}$, then so are $(x, 0)$ and $(0,y)$. Then $$\mathscr{C} = \{(x,y) \in \mathbb{R}^2_{\geq 0} \mid \forall \alpha \in [0,1]: \alpha x + (1-\alpha) y \leq C^{\alpha}\}.$$

This result continues to hold for subsets $\mathbb{R}^k_{\geq 0}$ for any positive integer k.

Next the maximal- and average-error capacity regions of the MAC with conferencing are studied. Let $(C_{12}, C_{21}) \in \mathbb{R}^2_{\geq 0}$ and $\mathscr{C}_{conf}(C_{12}, C_{21})$ denote the maximal- or average-error capacity region of the MAC with $(C_{12}, C_{21})$-conferencing. Then for every $(C_{12}, C_{21}) \in \mathbb{R}^2_{\geq 0}$, $$\mathscr{C}_{conf}(C_{12}, C_{21}) = \mathscr{C}(C_{in}, C_{out}), \quad (25)$$

where $$C_{in} = (C_{12}, C_{21}) \quad (26)$$

$$C_{out} = (C_{21}, C_{12}) \quad (27)$$

Equation (25) follows from the fact that for a CF whose input and output link capacities are given by Equations (26) and (27), the strategy where the CF forwards its received information from one encoder to the other is optimal.

For every $\alpha \in [0,1]$, define $$C_{conf}^{\alpha}(C_{12},C_{21}) = C^{\alpha}(C_{in},C_{out}), \quad (28)$$

where $C_{in}$ and $C_{out}$ are given by Equations (26) and (27). The next result considers the continuity of $C_{conf}^{\alpha}$ for various values of $\alpha \in [0,1]$.

Theorem 13. For every $\alpha \in [0,1]$, $C_{conf,avg}^{\alpha}$ is continuous on $\mathbb{R}_{>0}^2$ and $C_{conf,max}^{\alpha}$ is continuous on $\mathbb{R}_{>0}^2$. In addition, $C_{conf,max}^{1/2}$ is continuous at the point (0,0) as well.

Finally, note that the second part of Theorem 10 implies that there exists a MAC where for some $(C_{12},C_{21}) \in \mathbb{R}_{\geq 0}^2$, $\mathscr{C}_{\text{conf},max}(C_{12},C_{21}))$ is a proper subset of $\mathscr{C}_{\text{conf},avg}(C_{12},C_{21})$. Thus direct cooperation via conferencing does not necessarily lead to identical maximal- and average-error capacity regions.

Although the present invention has been described in certain specific aspects, many additional modifications and variations would be apparent to those skilled in the art. For example, the discussion proivded above references use of cooperation facilitators in the context of Guassian MACs. Cooperation facilitators in accordance with various embodiments of the invention can improve network performance in a variety of contexts involving shared resources. Furthermore, although specific techniques for building code books are described above, the processes presented herein can be utilized to generate code books that can be readily implemented in encoders used in typical communication devices to achieve low latency encoding of message data based upon data received from communication facilitators. It is therefore to be understood that the present invention can be practiced otherwise than specifically described without departing from the scope and spirit of the present invention. Thus, embodiments of the present invention should be considered in all respects as illustrative and not restrictive. Accordingly, the scope of he invention should be determined not by the embodiments illustrated, but by the appended claims and their equivalents.

What is claimed is:

1. A communication system, comprising:
    a plurality of nodes, that each comprise:
        a transmitter;
        a receiver; and
        an encoder that encodes message data for transmission using a plurality of codewords;
    a cooperation facilitator comprising:
        a transmitter; and
        a receiver;
    wherein the plurality of nodes are configured to transmit data parameters to the cooperation facilitator;
    wherein the cooperation facilitator is configured to generate cooperation parameters based upon the data parameters received from the plurality of nodes;
    wherein the cooperation facilitator is configured to transmit cooperation parameters to the plurality of nodes;
    wherein the encoder in each of the plurality of nodes selects a codeword from the plurality of codewords based at least in part upon the cooperation parameters received from the cooperation facilitator; and
    wherein the transmitter in each of the plurality of nodes transmits the selected codeword via a multiple terminal channel.

2. The communication system of claim 1, wherein a sum-capacity of the communication system achieved using codewords selected at least in part based upon the cooperation parameters received from the cooperation facilitator is greater than the sum-capacity of the communication system achieved when each of the plurality of encoders encodes data without communicating with a cooperation facilitator.

3. The communication system of claim 1, wherein a reliability of the communication system achieved using codewords selected at least in part based upon the cooperation parameters received from the cooperation facilitator is greater than the reliability of the communication system achieved with each of the plurality of encoders encodes data without communicating with a cooperation facilitator.

4. The communication system of claim 1, wherein the cooperation parameters include conferencing parameters.

5. The communication system of claim 1, wherein the cooperation parameters include coordinating parameters.

6. The communication system of claim 1, wherein the multiple terminal channel is a shared wireless channel.

7. The communication system of claim 1, wherein the multiple terminal channel can be approximated as a Gaussian multiple access channel.

8. The communication system of claim 1, wherein the plurality of nodes is two nodes.

9. The communication system of claim 1, wherein the plurality of nodes is at least three nodes.

10. The communication system of claim 1, wherein the transmitter in each of the plurality of nodes transmits to a plurality of receivers.

11. The communication system of claim 1, wherein the cooperation facilitator generates multiple rounds of cooperation parameters prior to codeword transmission.

12. The communication system of claim 1, wherein cooperation parameters are transmitted by the cooperation facilitator by a first channel to the plurality of nodes to a second channel on which one or more of the plurality of nodes transmit codewords selected at least in part based upon the cooperation parameters received from the cooperation facilitator.

13. A cooperation facilitator, comprising:
    a transmitter;
    a receiver; and
    a cooperation facilitator controller;
    wherein the cooperation facilitator controller is configured to receive data parameters from a plurality of nodes;
    wherein the cooperation facilitator controller is configured to generate cooperation parameters based upon the data parameters received from the plurality of nodes; and
    wherein the cooperation facilitator controller is configured to transmit cooperation parameters to the plurality of nodes that enable encoders in each of the plurality of nodes to select a codeword from a plurality of codewords for transmission.

14. The cooperation facilitator of claim 13, wherein a sum-capacity of a portion of a communication network including the cooperation facilitator achieved by encoders in each of the plurality of nodes using codewords selected at least in part based upon the cooperation parameters received from the cooperation facilitator is greater than the sum-capacity of the portion of a communication network achieved when each of the plurality of encoders encodes data without communicating with a cooperation facilitator.

15. The cooperation facilitator of claim 13, wherein a reliability of a portion of a communication network including the cooperation facilitator achieved by encoders in each of the plurality of nodes using codewords selected at least in part based upon the cooperation parameters received from the cooperation facilitator is greater than the reliability of the portion of a communication network achieved with each of the plurality of encoders encodes data without communicating with a cooperation facilitator.

16. The cooperation facilitator of claim 13, wherein the cooperation parameters include conferencing parameters.

17. The cooperation facilitator of claim 13, wherein the cooperation parameters include coordinating parameters.

18. The cooperation facilitator of claim 13, wherein a transmitter in each of the plurality of nodes transmits data via a multiple access channel.

19. The cooperation facilitator of claim 16, wherein the multiple access channel is a shared wireless channel.

20. The cooperation facilitator of claim 16, wherein the multiple access channel is a Gaussian multiple access channel.

21. The cooperation facilitator of claim 13, wherein the plurality of nodes is two nodes.

22. The cooperation facilitator of claim 13, wherein the plurality of nodes is at least three nodes.

23. The cooperation facilitator of claim 13, wherein the cooperation facilitator generates multiple rounds of cooperation parameters prior to codeword transmission.

24. The communication system of claim 1, wherein a first network performance metric of the communication system achieved using codewords selected at least in part based upon the cooperation parameters received from the cooperation facilitator is greater than a second network performance metric of the communication system achieved with each of the plurality of encoders encodes data without communicating with the cooperation facilitator.

25. The communication system of claim 24, wherein the first network performance metric is a first sum-capacity of the communication system and the second network performance metric is a second sum-capacity of the communication system.

26. The communication system of claim 24, wherein the first network performance metric is a first reliability of the communication system and the second network performance metric is a second reliability of the communication system.

27. The communication system of claim 1, wherein the multiple terminal channel is a multiple access channel.

28. The cooperation facilitator of claim 13, wherein a first network performance metric of the cooperation facilitator achieved using codewords selected at least in part based upon the cooperation parameters received from the cooperation facilitator is greater than a second network performance metric of the communication system achieved with each of the plurality of encoders encodes data without communicating with the cooperation facilitator.

29. The cooperation facilitator of claim 28, wherein the first network performance metric is a first sum-capacity of the cooperation facilitator and the second network performance metric is a second sum-capacity of the cooperation facilitator.

30. The cooperation facilitator of claim 28, wherein the first network performance metric is a first reliability of the cooperation facilitator and the second network performance metric is a second reliability of the cooperation facilitator.

* * * * *